United States Patent [19]
Horigome et al.

[11] Patent Number: 5,682,374
[45] Date of Patent: Oct. 28, 1997

[54] RECORDING MEDIUM HAVING A RECORDED PHASE REFERENCE SIGNAL FOR FINE ADJUSTMENT OF A PHASE SAMPLING CLOCK SIGNAL

[75] Inventors: Toshihiro Horigome; Seiji Kobayashi, both of Kanagawa, Japan

[73] Assignee: Sony Corporation, Tokyo, Japan

[21] Appl. No.: 507,158

[22] Filed: Jul. 26, 1995

[30] Foreign Application Priority Data

Jul. 29, 1994 [JP] Japan .................................. 6-177894

[51] Int. Cl.⁶ .................................................. G11B 7/00
[52] U.S. Cl. ...................... 369/275.3; 369/48; 369/54
[58] Field of Search ...................... 369/275.1–275.4, 369/54, 58, 59, 47

[56] References Cited

U.S. PATENT DOCUMENTS

| | | | |
|---|---|---|---|
| 4,774,522 | 9/1988 | Van Tongeren et al. | 346/1.1 |
| 4,809,251 | 2/1989 | Collomby et al. | 369/32 |
| 4,873,680 | 10/1989 | Chung et al. | 369/59 |
| 4,932,017 | 6/1990 | Van Uijen | 369/48 |
| 5,034,940 | 7/1991 | Saito et al. | 369/44.34 |
| 5,063,546 | 11/1991 | Ito et al. | 369/32 |
| 5,206,853 | 4/1993 | Tanaka | 369/54 |
| 5,233,589 | 8/1993 | Saito et al. | 369/48 |
| 5,282,185 | 1/1994 | Mori et al. | 369/48 |
| 5,321,680 | 6/1994 | Bailey | 369/59 |
| 5,345,434 | 9/1994 | Ide et al. | 369/124 |
| 5,347,505 | 9/1994 | Moritsugu et al. | 369/59 |
| 5,404,345 | 4/1995 | Taki | 369/44.26 |
| 5,414,689 | 5/1995 | Maeda et al. | 369/116 |
| 5,418,770 | 5/1995 | Ide et al. | 369/116 |
| 5,450,381 | 9/1995 | Tsukamura et al. | 369/13 |
| 5,517,481 | 5/1996 | Kobayashi | 369/59 |
| 5,524,103 | 6/1996 | Shimizu et al. | 369/59 |
| 5,566,158 | 10/1996 | Kobayashi et al. | 369/59 |
| 5,615,193 | 3/1997 | Kobayashi et al. | 369/48 |

FOREIGN PATENT DOCUMENTS

| | | |
|---|---|---|
| 0540345 A1 | 5/1993 | European Pat. Off. . |
| 62-3445 | 1/1987 | Japan . |
| 63-48617 | 3/1988 | Japan . |
| 63-231733 | 9/1988 | Japan . |

(List continued on next page.)

OTHER PUBLICATIONS

U.S. application No. 08/676,903, Kobayashi et al. filed Jul. 1996.
U.S. application No. 08/729,800, Kobayashi et al. filed Oct. 1996.
U.S. application No. 08/544,338, Kobayashi et al. filed Oct. 1995.
U.S. application No. 08/739,939, Horigome et al. filed Oct. 1996.
U.S. application No. 08/648,309, Kobayashi et al. filed Jul. 1996.
U.S. Appln. Serial No. 08/133,156, f. Oct. 13, 1993, Seiji Kobayashi et al. Information Recording Medium Wherein Multi–Bit Digital Information is Represented by a Shift Amount of a Pit Edge, and Recording Apparatus, Reproducing Apparatus, and Recording and Reproducing Apparatus Therefor.
U.S. Appln. Serial No. 08/133,124, f. Oct. 13, 1993 by Seiji Kobayashi et al. Information Recording Medium and a Recording Apparatus and a Reproducing Apparatus Therefor.

*Primary Examiner*—Nabil Hindi
*Attorney, Agent, or Firm*—Limbach & Limbach L.L.P.

[57] ABSTRACT

The invention provides a recording medium as well as a recording apparatus and a reproducing apparatus for the recording medium by which data can be reproduced even when a skew occurs. Reference signal areas and data areas are provided periodically on an optical disk. Each of the reference signal areas has recorded thereon a synchronizing signal, a gain reference signal and a bias reference signal as well as a phase reference signal for correction of a displacement of sampling at the trailing edge of a pit and a phase reference signal for detection of a displacement of sampling at the trailing edge of a pit.

7 Claims, 28 Drawing Sheets

FOREIGN PATENT DOCUMENTS

| | | |
|---|---|---|
| 63-298818 | 12/1988 | Japan . |
| 1-185839 | 7/1989 | Japan . |
| 1-263964 | 10/1989 | Japan . |
| 3-66735 | 10/1991 | Japan . |
| 3-288331 | 12/1991 | Japan . |
| 4-74317 | 3/1992 | Japan . |
| 4-366426 | 12/1992 | Japan . |

FIG. 6
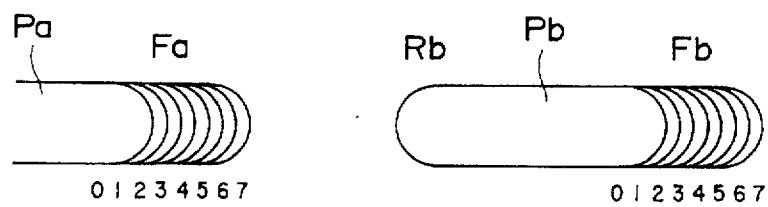
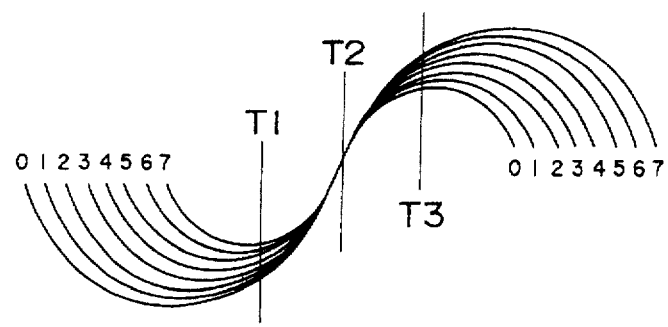
FIG. 7A 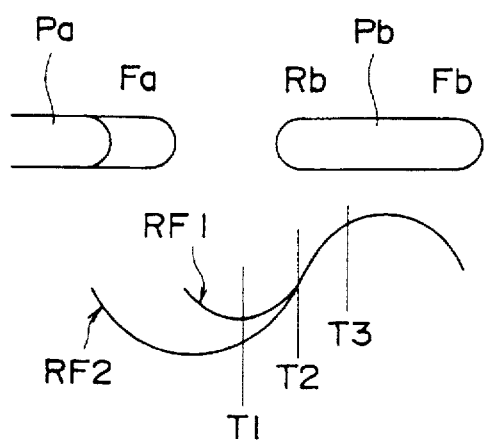 FIG. 7B 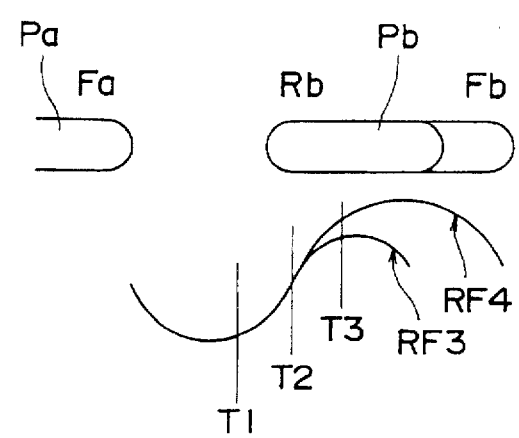

FIG. 8A
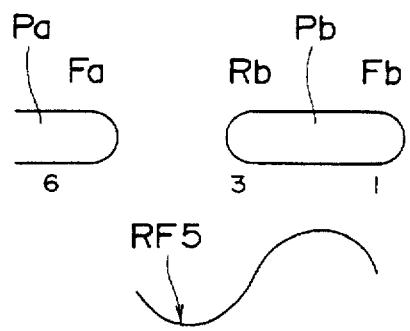
FIG. 8B
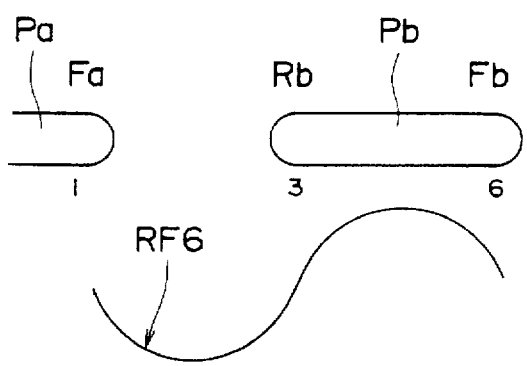
FIG. 8C
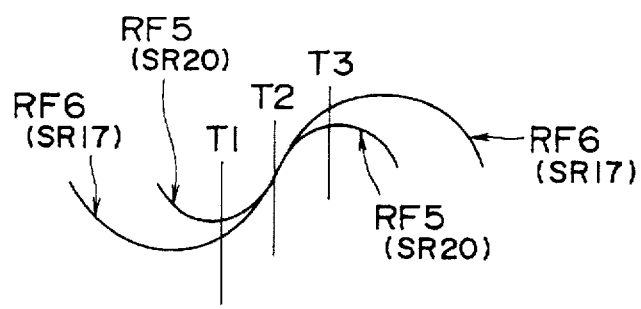
FIG. 9
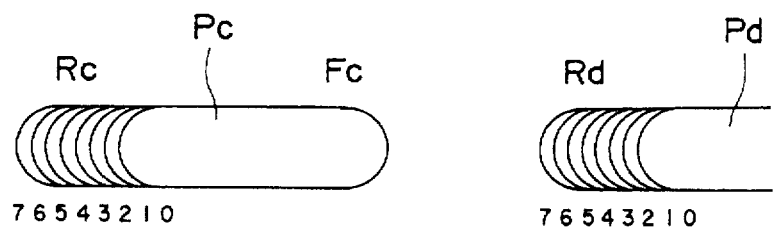
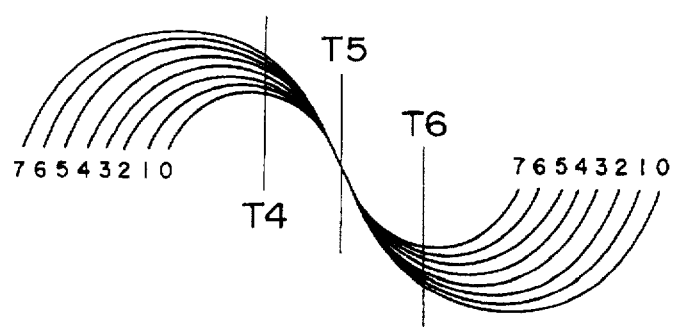

Gr  Gf     Br Bf
GAIN       BIAS

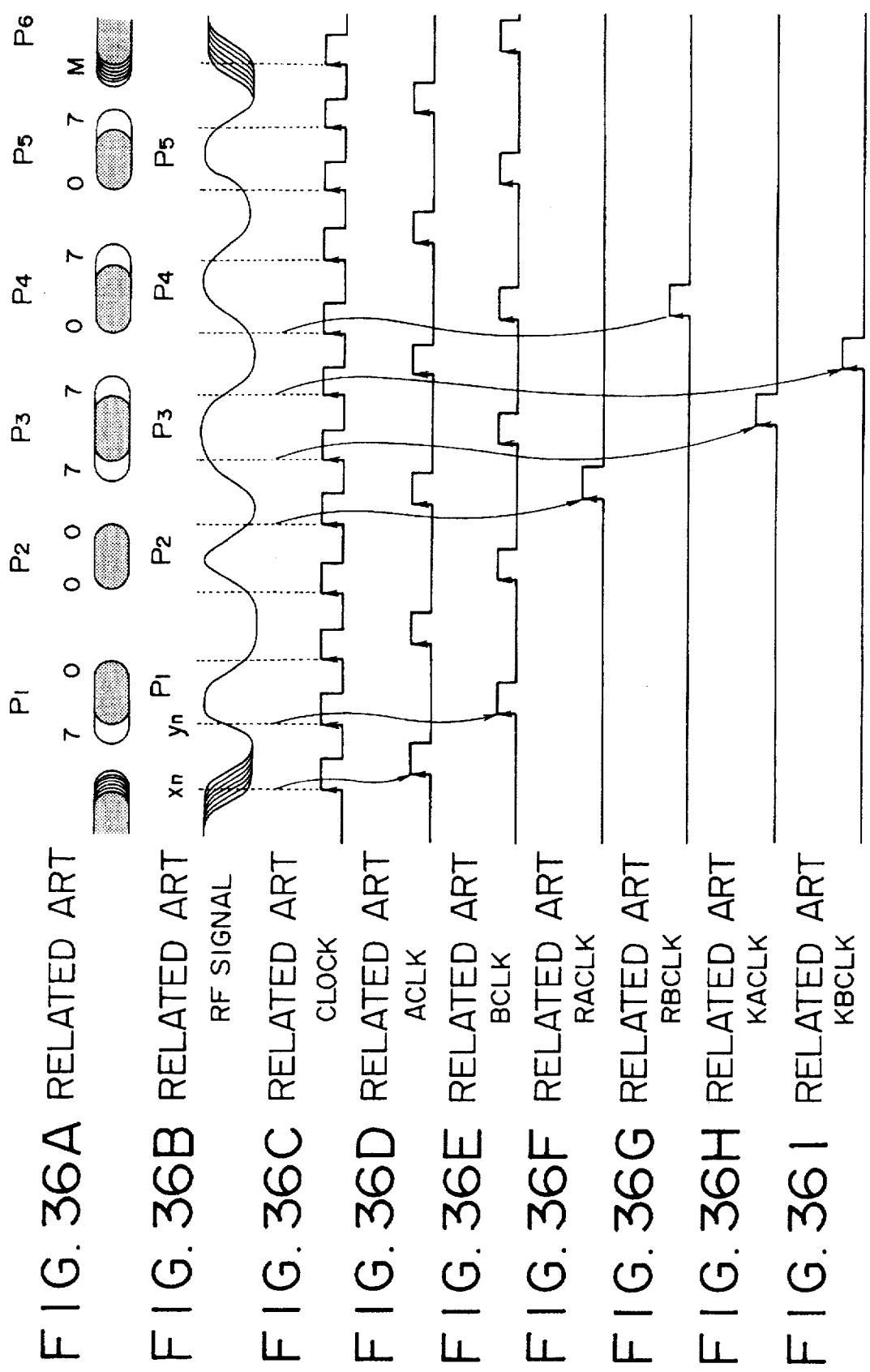

5,682,374

RECORDING MEDIUM HAVING A RECORDED PHASE REFERENCE SIGNAL FOR FINE ADJUSTMENT OF A PHASE SAMPLING CLOCK SIGNAL

BACKGROUND OF THE INVENTION

1. Field of the Invention

This invention relates to a recording medium as well as a recording apparatus and a reproduction apparatus for the same suitable for use to record and reproduce data onto and from, for example, an optical disk, a magneto-optical disk or the like.

2. Description of the Related Art

A conventional optical disk which is used in a CAV (constant angular velocity) mode has servo byte intervals provided periodically at predetermined positions of each track, and clock pits for generation of reference clocks and wobbled pits for tracking are formed in each of the servo byte intervals. Thus, reference clocks (channel clocks) are produced corresponding to the clock pits, and information is digitally recorded in the form of pits having a length equal to an integral number of times the period of the reference clocks.

Meanwhile, in a recording medium which is used in a CLV (constant linear velocity) mode such as, for example, a CD (compact disk), no clock pits are provided, but instead, the length of and the distance between pits recorded thereon are selected so as to be equal to lengths integral numbers of times (in the case of a CD, nine different lengths from approximately 0.9 μm to 3.3 μm) the period (0.3 μm) of reference clocks (channel clocks). The system just described is called self clocking system. Thus, clock components included in a reproduction RF signal reproduced from the recording medium are extracted to cut out the recorded information of the recording medium in units of a pit.

On the other hand, in a video disk which is one of optical disks, a video signal is recorded and reproduced in a form frequency modulated with a difference in length between pits much smaller than that of a CD. This will be described below by way of an example of a signal recorded at a location of a video disk at a radius of 55 mm in a CAV mode. On a video disk, the brightest portion of a video signal is recorded as a signal of 9.3 MHz whereas the darkest portion is recorded as a signal of 7.6 MHz, and the signals correspond to 1.075 μm and 1.316 μm, respectively, on a disk of the radius of 55 mm. It is well known in the art that a very beautiful image is reproduced from the disk recorded in this manner.

If it is assumed that the variation in brightness of 128 gradations can be represented with the image, then this signifies that pits are recorded on and reproduced form the disk with a fine variation in period of more than 128 gradations. In particular, the variation in pit length and distance between pits of (1.316 μm−1.075 μm)÷128=0.002 μm is reflected on the video signal.

The reason why the minimum unit of a variation in pit length in a CD must be as great as 0.3 μm although such a fine variation as described above can be recorded as a variation in length of a pit principally resides in that the recording and reproducing method involved is not optimum.

The assignee of the present invention has proposed in U.S. patent application Ser. No. 08/133,156 to record a piece of digital information by shifting the position of the leading edge or the trailing edge of an information pit stepwise from a predetermined reference position in accordance with recording information. With the recording and reproducing method, since the variation in pit length and in position of a pit edge can be detected with a very high degree of accuracy, digital information can be recorded with a very fine variation which has formerly been considered impossible. As a result, the recording and reproducing method has realized higher density information recording than ever.

The assignee of the present invention has further proposed, in U.S. patent application Ser. No. 08/133,124, a method of two-dimensionally decoding data recorded in such a manner as described above. According to the method, education pits are formed in advance on an optical disk. As combinations (M, N) of the leading edge M and the trailing edge N of an education pit, 64 (=8×8) combinations from (0, 0) to (7, 7) are prepared. Such education pits are reproduced, and reference points are mapped on a RAM in accordance with reproduction levels of the education pits.

Then, ordinary data pits are reproduced, and the levels of a reproduction RF signal at two positions of the leading edge and the trailing edge of each of the data pits are sampled and a point on the RAM specified by the two levels is determined. Then, a reference point nearest to the thus specified point on the RAM is determined, and data is decoded regarding, as the edges of the data pit, edges of the same combination as that of the edges of the education pit to which the reference point corresponds.

FIG. 29 shows an example of a basic format of such an optical disk proposed formerly by the assignee of the present invention as described above.

Referring to FIG. 29, in the example shown, pit trains are recorded in a CLV mode at the track pitch of 1.6 μm on an optical disk 91 of the reflection type (which has pits formed as physical recessed portions or protruded portions on a reflection face thereof for a light beam) having a diameter of 120 mm. All information are recorded as eight different shift amounts of the edge positions of the leading edges (rising edges) and the trailing edges (falling edges) of the pits disposed for each fixed period of 1.67 μm. The unit shift amount Δ which is a unit of the shift amounts is set to 0.05 μm.

Since a piece of digital information of 3 bits is recorded as one of the eight different shift amounts of each of the edge positions of the pits arranged in such a manner as described above, the linear recording information density in the direction of a pit train is 0.28 μm/bit, which is more than twice that of existing CD systems.

It is to be noted that, in a CD system, also where the linear velocity is set to 1.2 m/s at the upper limit, data bits of 8 bits to be recorded are converted, by EFM (Eight to Fourteen Modulation) modulation, into channel bits of totaling 17 bits including information bits of 14 bits and margin bits of 3 bits and recorded on pits on a disk, and accordingly, where such EFM modulation is taken into consideration, the linear recorded information density is about 0.6 μm/bit. In particular, since the shortest pit of approximately 0.9 μm corresponds to 3 channel bits, the linear recorded information density is given as (0.9÷3)×(17÷8)=approximately 0.6 μm/bit Here, as shown in FIG. 30, the edge positions of a pit recorded on the optical disk 91 are shifted stepwise in accordance with digital information to be recorded from a reference position at the center of the pit, and the shift period Ts (=Δ×7) is set within a range which corresponds to a period smaller than a rising period tr or a falling period tf which is a transition period (period other than a period of a steady state in which a 0 level or a saturation level is exhibited) of an RF signal (reproduction signal) which depends upon the transmission characteristic of an optical detection system.

The RF signal mentioned above is outputted from a pickup 93 of a reproduction apparatus which will be hereinafter described, and the transition period depends upon the transmission characteristic of the pickup 93. Generally, the transmission characteristic of an optical system is defined by an MTF (Modulation Transfer Function) which is an absolute value of an optical transfer function (OTF) of the optical system, and the MTF relies upon the aperture number NA of a lens and the wavelength $\lambda$ of a laser.

The recording density can be further raised if the unit shift amount $\Delta$ is shifted by a shift amount further smaller than 0.05 µm within the shift period Ts.

By performing A/D conversion of an RF signal at the timing of, for example, a rising edge of a sampling clock SP synchronized in phase with a reference position at the center of a pit recorded in this manner, reproduction levels L0 to L7 corresponding to shift amounts 0 to 7 of the edge positions of pits can be obtained. The requirement that any of the reproduction levels L0 to L7 can be detected by performing sampling once within the transition period tr or tf of the RF signal in this manner is shift period Ts≦transition period (rising time tr of falling time tf)

Here, the sampling timing with the sampling clock SP preferably corresponds to the center of the shift period Ts. Where the sampling timing is set in this manner, a reproduction level can be detected over the entire range of each transition period of the RF signal.

Further, while, in the example shown in FIG. 30, the disk is an optical disk of the reflection type which has pits formed as physical recessed or protruded portions on a reflection face thereof for an optical beam, this principle can be applied also to an MO (magneto-optical) disk or a like disk on which pits (marks) are formed by local reversals of magnetization of a magneto-optical film.

Digital information recorded on the optical disk 91 is cut out in units of 3 bits and recorded to an nth pit as recording data (codes) an and bn. FIG. 31 illustrates the manner of recording. Referring to FIG. 31, the leading edge of the pit is set to one of eight shift positions of 0 to 7 in accordance with the recording data an. Similarly, also the position of the trailing edge is set to one of eight shift positions of 0 to 7 in accordance with the recording data bn. The pitch $\Delta$ between the shift positions is 0.05 µm as described above. As a result, the length LP of a pit exhibits the lowest value LP=0.5 µm when the recording data an and bn are both formed at the edges of the shift positions 0.

Referring back to FIG. 29, in the optical disk 91 shown, a servo area including six servo pits P1 to P6 for servoing control is inserted between a data area which is formed from 43 data pits in accordance with recording data and another data area. Of the six pits recorded in the servo area, the pit P6 is used as an education pit, and the pits P1 to P5 are used as reference pits. The position of the leading edge of the education pit P6 on the left side in FIG. 29 is set to a position M which is one of the eight shift positions from 0 to 7, and also the trailing edge on the right side in FIG. 29 is set to a position N which is one of the eight different shift positions from 0 to 7.

The combination of the position M of the leading edge and the position N of the trailing edge of the education pit P6 is set regularly so that it may be different among different servo areas. In particular, the combination of the positions M and N is (0, 0) in a first servo area and is (0, 1) in a next servo area. Similarly, the combination is set regularly so that it may vary like (0, 2), (0, 3), . . . , (7, 6) and (7, 7). Consequently, by reproducing totaling 64 (=8×8) servo areas, all possible combinations of the positions of the leading edge and the trailing edge of the education pit P6 can be detected.

The reference pits P2 to P4 are provided to obtain data at the reference positions of (0, 0) and (7, 7). The reference position data can be theoretically formed at the opposite edges of, for example, the pit P1 or P5. However, where the reference position data is formed in this manner, the ratio of interference from an adjacent data area is varied by recording data, and therefore, reference position data is preferably formed at the pits P2 to P4 between the dummy reference pits P1 and P5 (the data are always fixed) as in the present example.

Further, if one of the edges of the reference pits P1 to P5 is set to the edge as a reference for production of a clock, a clock signal can be produced accurately without being influenced by recording data.

FIG. 32 illustrates an outline of the structure of the optical disk 91 in a plane. Referring to FIG. 32, since a signal recorded at the track pitch of 1.6 µm is recorded in a CLV mode, the pit positions in adjacent tracks do not coincide in phase with each other, but signals are recorded in random phases on the disk as seen in FIG. 32.

FIG. 33 shows, in block diagram, a construction of an example of an optical disk reproducing apparatus. Referring to FIG. 33, an optical disk 91 is rotated by a spindle motor 92. The optical disk 91 has digital information recorded thereon in accordance with the principle described hereinabove with reference to FIGS. 29 and 30. In particular, the position of at least one of the leading edge and the trailing edge of a pit is shifted stepwise from a predetermined reference position to record a piece of digital information at the pit. A plurality of servo areas are formed in a fixed period on the optical disk 91, and reference pits P1 to P5 and an education pit P6 are formed in each of the servo areas. Naturally, data pits are formed in data areas of the optical disk 91.

A pickup 93 irradiates a laser beam upon the optical disk 91 and reproduces a signal recorded on the optical disk 91 from reflected light from the optical disk 91. An RF signal outputted from the pickup 93 is amplified by a head amplifier 94 and supplied to an A/D (analog to digital) conversion circuit 95 and a PLL (phase locked loop) circuit 96.

The PLL circuit 96 extracts, from an input signal thereto, an edge of a predetermined pit (for example, the reference pit P2) as a clock component. While a PLL circuit employed in ordinary CD systems reproduces clocks using the entire RF signal, in the example shown in FIG. 33, clocks are reproduced using an RF signal only in each servo area. In particular, since pits in any servo area are not modulated with recording data, stabilized clocks can be reproduced from the pits of the servo areas without being influenced from recording data at all.

Meanwhile, the RF signal outputted from the head amplifier 94 is inputted to the A/D conversion circuit 95, by which it is converted from analog data into digital data (reproduction level) of 8 bits for representation of 256 different levels at the timing of the rising edge of a sampling clock SP outputted from the PLL circuit 96. The 8-bit data is supplied to a bias removal circuit 97, by which a bias component is removed from the 8-bit data. The output of the bias removal circuit 97 is inputted to an automatic gain control (AGC) circuit 98, by which the gain of the input signal is controlled. The output of the AGC circuit 98 is inputted to an error detection correction (ECC) circuit 100 by way of a non-linear equalizer 99. The error detection correction circuit 100 detects and corrects an error of the data inputted thereto and outputs a resulted signal, for example, to an analog audio amplifier not shown by way of a D/A conversion circuit not shown.

FIG. 34 shows an example of constructions of the bias removal circuit 97 and the AGC circuit 98. Referring to FIG. 34, the bias removal circuit 97 includes two pairs of latch circuits 111, 112 and 121, 123 for latching the output of the A/D conversion circuit 95, a subtraction circuit 122 for subtracting the output of the latch circuit 121 from the output of the latch circuit 111, and another subtraction circuit 124 for subtracting the output of the latch circuit 123 from the output of the latch circuit 112.

Meanwhile, the AGC circuit 98 includes a latch circuit 131 for latching the output of the subtraction circuit 122, a subtraction circuit 132 for subtracting a predetermined aimed amplitude from the output of the latch circuit 131, a variable gain amplifier 133 for controlling the level of the output of the subtraction circuit 122 in accordance with the output of the subtraction circuit 132, another latch circuit 134 for latching the output of the subtraction circuit 124, another subtraction circuit 135 for subtracting a predetermined aimed amplitude from the output of the latch circuit 134, and a variable gain amplifier 136 for controlling the level of the output of the subtraction circuit 124 in accordance with the output of the subtraction circuit 135. The output of the variable gain amplifier 133 or 136 is selected by a switch 137 and outputted as an output of the AGC circuit 98.

It is to be noted that the variable gain amplifiers 133 and 136 can be constituted from a ROM. In this instance, the outputs of the subtraction circuits 122 and 132 (subtraction circuits 124 and 135) are inputted as an address to the ROM to read out data corresponding to the address.

Subsequently, operation of the bias removal circuit 97 and the AGC circuit 98 shown in FIG. 34 will be described with reference to a pattern of a servo area shown in FIG. 35 and a time chart shown in FIG. 36. As seen from FIG. 35, reference position data 0 is recorded at the trailing end of the reference pit P2 and the leading end of the reference pit P4. Further, reference position data 7 is recorded at the leading end and the trailing end of the reference pit P3.

When such data pits, reference pits and education pit as shown in FIG. 35 (FIG. 36A) are reproduced, such an RF signal as seen in FIG. 36B is obtained. The RF signal is inputted to the A/D conversion circuit 95, by which it is converted from an analog signal into a digital signal at the timing of each clock shown in FIG. 36C. In particular, the A/D conversion circuit 95 samples the levels at the leading edge and the trailing edge of each pit.

The latch circuit 111 latches the output of the A/D conversion circuit 95 in response to an ACLK signal illustrated in FIG. 36D. The ACLK signal is generated at a timing at which data at the trailing edge of each pit is to be latched. Accordingly, data corresponding to the trailing edge of each pit is latched into the latch circuit 111. Meanwhile, the latch circuit 121 latches the output of the A/D conversion circuit 95 in response to an RACLK signal illustrated in FIG. 36F. Since the RACLK signal is generated at a timing at which reference position data 0 at the trailing end of the reference pit P2 is to be latched, the reference position data 0 at the trailing end of the reference pit P2 is latched into the latch circuit 121. The subtraction circuit 122 subtracts the reference position data 0 at the trailing end of a pit latched by the latch circuit 121 from the data at the trailing edge of a pit latched by the latch circuit 111.

Similarly, data corresponding to the leading edge of each pit is latched into the latch circuit 112 at the timing of a BCLK signal illustrated in FIG. 36E, and the reference position data 0 at the leading end of the reference pit P4 is latched into the latch circuit 123 at the timing of an RBCLK signal shown in FIG. 36G. Then, the subtraction circuit 124 subtracts the reference position data 0 at the leading edge of the reference pit P4 latched by the latch circuit 123 from the data at the leading edge of a pit latched by the latch circuit 112.

By subtracting data at the position 0 from data corresponding to the position of an edge of each pit in this manner, a DC component (bias component) of the reproduction signal can be removed. Consequently, even if the reproduction level (absolute level) corresponding to a shifted position of an edge of each pit is varied due to a dispersion of the optical disk 91 or an optical system of the pickup 93 or from some other cause, a correct shifted position can be discriminated accurately.

The output of the subtraction circuit 122 is latched at the timing of a KACLK signal illustrated in FIG. 36H into the latch circuit 131. In particular, the reference position data 7 recorded at the leading edge of the reference pit P3 is latched into the latch circuit 131. A preset aimed amplitude is subtracted from the output of the latch circuit 131 by the subtraction circuit 132. Then, the difference is supplied to the variable gain amplifier 133.

The variable gain amplifier 133 adjusts the gain of a signal supplied thereto from the subtraction circuit 122 in accordance with a signal supplied thereto from the subtraction circuit 132. Consequently, the level of the reference position data 7 of a signal to be outputted form the variable gain amplifier 133 is set so as to be equal to an aimed amplitude.

Similarly, the output of the subtraction circuit 124 is latched into the latch circuit 134 at the timing of a KBCLK signal illustrated in FIG. 36I. In particular, the reference position data 7 recorded at the trailing edge of the reference pit P3 is latched into the latch circuit 134. The data latched by the latch circuit 134 is supplied to the subtraction circuit 135, by which the aimed amplitude is subtracted from the data, and the output of the subtraction circuit 135 is supplied to the variable gain amplifier 136.

The variable gain amplifier 136 adjusts the gain of a signal supplied thereto from the subtraction circuit 124 in accordance with a signal supplied thereto from the subtraction circuit 135. Consequently, the level of the reference position data 7 of a signal to be outputted from the variable gain amplifier 136 is adjusted so as to be equal to an aimed amplitude.

By adjusting the gain by means of the AGC circuit 98 in this manner, data can be read accurately even where the optical disk 91 has some local dispersion in characteristic.

As described above, with the optical disk 91 proposed formerly by the assignee of the present invention, a signal corresponding to an edge of a predetermined pit in a servo area is detected as a synchronizing signal, and a sampling clock synchronized with the synchronizing signal is produced by the PLL circuit 96 and a reproduction signal is sampled in response to the sampling clock by the A/D conversion circuit 95.

As a result, even if the optical disk 91 is mounted in a condition inclined relative to the pickup 93 and thus causes a skew, a displacement in phase occurs with sampling clocks produced by the PLL circuit 96. While such phase displacement is basically absorbed by operation of the PLL circuit 96, it cannot be absorbed completely. Although it is possible to narrow a servo band width of the PLL circuit 96 to reduce the amount of the displacement, if the servo band width is reduced excessively, then locking of the PLL circuit 96 is cancelled readily when a disturbance occurs. Therefore, it is necessary to assure a certain band width, but if the band width is increased, then fine adjustment against the phase displacement becomes difficult.

From the reason described above, the distance between pits to be recorded on the optical disk 91 or the shift amount of an edge of a pit must be set to a certain high value, and this makes an obstacle to improvement in recording density.

SUMMARY OF THE INVENTION

It is an object of the present invention to provide a recording medium as well as a recording apparatus and a reproducing apparatus for the recording medium by which a fine phase displacement of a sampling clock can be adjusted to allow higher density recording.

In order to attain the object described above, according to an aspect of the present invention, there is provide a recording medium wherein positions of a leading edge and a trailing edge of each of pits formed at predetermined periods are shifted to individually selected ones of predetermined stepwise positions from a respective reference position in accordance with recording data to record the recording data on the recording medium, and the thus recorded data are read by sampling a reproduction signal reproduced from the recording medium in synchronism with a sampling clock signal, wherein first areas in which the recording data are recorded and second areas in which a reference signal for reading the recording data recorded in the first areas is recorded are formed periodically thereon, and the reference signal includes a phase reference signal which serves as a reference for fine adjustment of a phase of the sampling clock signal.

The phase reference signal may include a signal of a first pattern constituted from positions of three successive first, second and third edges, and a signal of a second pattern constituted from positions of successive three other fourth, fifth and sixth edges and complementary to the first pattern. In this instance, the recording medium may be constructed such that the position of the first edge constituting the first pattern is a first position near to the reference position; the position of the third edge is a third position far from the reference position; and the position of the second edge is an arbitrary second position, and the position of the fourth edge constituting the second pattern is the third position far from the reference position; the position of the sixth edge is the first position near to the reference position; and the position of the fifth edge is the second position. Further, the first position may be a position nearest to the reference position while the third position is another position farthest from the reference position. In this instance, the second position is the same as one of the first and third positions. Further, the recording medium may be constructed such that the reference signal includes at least one of a bias reference signal for adjustment of a level of the reproduction signal at the edge nearest to the reference position and a gain reference signal for adjustment of the level of the reproduction signal at the edge farthest from the reference position, and at least one of the first to sixth edges constitute one of the edges for the bias reference signal and the gain reference signal. In this instance, the recording medium may be constructed such that the phase reference signal includes a first position reference signal for fine adjustment of a phase of a first sampling clock signal for sampling the reproduction signal at the leading edges and a second phase reference signal for fine adjustment of a phase of a second sampling clock signal for sampling the reproduction signal at the trailing edges while the shift positions of the edges include eight different positions from a position 0 nearest to the reference position to a position 7 farthest from the reference position, and when the position 7 or another position near to the position 7 is represented as position A while the position 0 or another position near to the position 0 is represented as position B, the first and second phase reference positions, the bias reference signal and the gain reference signal are constituted from seven successive edges of the position A, the position A, the position B, the position B, the position B, the position A and the position A. Or, the recording medium may be constructed such that the phase reference signal includes a first position reference signal for fine adjustment of a phase of a first sampling clock signal for sampling the reproduction signal at the leading edges and a second phase reference signal for fine adjustment of a phase of a second sampling clock signal for sampling the reproduction signal at the trailing edges while the shift positions of the edges include eight different positions from a position 0 nearest to the reference position to a position 7 farthest from the reference position, and when the position 7 or another position near to the position 7 is represented as position A while the position 0 or another position near to the position 0 is represented as position B, the first and second phase reference positions, the bias reference signal and the gain reference signal are constituted from seven successive edges of the position B, the position B, the position A, the position A, the position A, the position B and the position B.

Alternatively, the phase reference signal may include a first position reference signal for fine adjustment of a phase of a first sampling clock signal for sampling the reproduction signal at the leading edges, and a second phase reference signal for fine adjustment of a phase of a second sampling clock signal for sampling the reproduction signal at the trailing edges. In this instance, the reference signal may further include a synchronizing signal for production of the sampling clock signal.

With the recording medium described above, a reference signal for reading recording data recorded in the first areas of the recording medium is recorded in the second areas of the recording medium. The reference signal includes a phase reference signal which serves as a reference for fine adjustment of a phase of a sampling clock signal. Accordingly, the data recorded on the recording medium can be reproduced accurately even if a skew or the like occurs with the recording medium. Further, recording data can be recorded on the recording medium with a higher density than ever.

According to another aspect of the present invention, there is provided a recording apparatus for recording data onto such a recording medium as described above, which comprises first generation means for generating a signal corresponding to the recording data, second generation means for generating the reference signal, selection means for selecting one of an output of the first generation means and an output of the second generation means, and calculation means for calculating an edge position corresponding to a signal selected by the selection means.

Where the reference signal includes at least one of a bias reference signal for adjustment of a level of the reproduction signal at the edge nearest to the reference position, a gain reference signal for adjustment of the level of the reproduction signal at the edge farthest from the reference position, and a synchronizing signal for production of the sampling clock signal, the second generation means may include at least one of bias reference signal generation means for generating the bias reference signal, gain reference signal generation means for generating the gain reference signal, and synchronizing signal generation means for generating the synchronizing signal.

With the recording apparatus of the construction described above, one of recording data reproduced from a recording medium by the first generation means and a reference signal reproduced form the recording medium by the second generation means is selectively outputted by the selection means, and an edge position corresponding to the reference signal is calculated by the calculation means. Consequently, the recording apparatus can produce a recording medium from which recorded data can be read accurately even if a skew or the like occurs with the recording medium.

According to a further aspect of the present invention, there is provided a reproduction apparatus for reproducing data recorded on such a recording medium as described above, which comprises reproduction means for reproducing the recording medium, sampling clock production means for producing the sampling clock signal in response to the reproduction signal reproduced from the recording medium by the reproduction means, sampling means for sampling the reproduction signal from the recording medium in response to the sampling clock signal, and phase adjustment means for finely adjusting a phase of the sampling clock signal in response to the phase reference signal sampled by the sampling means.

Where the phase reference signal which includes a signal of a first pattern constituted from positions of three successive first, second and third edges and a signal of a second pattern constituted from positions of successive three other fourth, fifth and sixth edges and complementary to the first pattern is recorded on the recording medium, the phase adjustment means may include delaying means for delaying the sampling clock signal produced by the sampling clock production means, extraction means for extracting a signal of the first pattern and a signal of the second pattern, which constitute the phase reference signal, from an output of the sampling means, and control signal production means for producing a control signal to control a delaying time of the delaying means from a signal extracted by the extraction means. The extraction means may include holding means for holding the output of the sampling means corresponding to the second edge and the fifth edge, and the control signal production means includes subtraction means for calculating a difference between the signals held by the holding means. In this instance, the reproduction apparatus may be constructed such that the control signal production means further includes conversion means for converting an output of the subtraction means into a control signal of a level corresponding to a magnitude of the output of the subtraction means, and the delaying means includes triangular wave generation means for generating a triangular wave synchronized with the sampling clock signal produced by the sampling clock production means, comparison means for comparing the triangular wave generated by the triangular wave generation means in magnitude with the control signal outputted from the conversion means, and pulse generation means for generating a pulse as the sampling clock after phase adjustment in response to an output of the comparison means. Alternatively, where the phase reference signal includes a first position reference signal for fine adjustment of a phase of a first sampling clock signal for sampling the reproduction signal at the leading edges, and a second phase reference signal for fine adjustment of a phase of a second sampling clock signal for sampling the reproduction signal at the trailing edges, the reproduction apparatus may be constructed such that each of the holding means, the subtraction means and the delaying means is provided by a pair separately for the first phase reference signal and for the second phase reference signal, the sampling clock production means generating the first sampling clock signal at a timing of each trailing edge whereas the sampling clock production means generates the second sampling clock signal at a timing of each leading edge, the delaying means for the first phase reference signal delaying the first sampling clock signal generated at the timing of each trailing edge in accordance with the control signal produced by the holding means and the subtraction means for the first phase reference signal to produce and output the first sampling clock signal for sampling the reproduction signal at the leading edge, the delaying means for the second phase reference signal delaying the second sampling clock signal generated at the timing of each trailing edge in accordance with the control signal produced by the holding means and the subtraction means for the second phase reference signal to produce and output the second sampling clock signal for sampling the reproduction signal at the trailing edge.

In the reproduction apparatus of the construction described above, the phase of a sampling clock reproduced from a recording medium by the sampling clock production means is finely adjusted by the phase adjustment means. Consequently, the reproduction apparatus can read the recorded data of the recording medium accurately even if a skew or the like occurs with the recording medium.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a diagrammatic view illustrating a displacement of sampling of a leading edge;

FIGS. 7A and 7B are diagrammatic views illustrating displacement of sampling of a leading edge;

FIGS. 8A, 8B and 8C are diagrammatic views illustrating a displacement of sampling of a leading edge;

FIG. 9 is a diagrammatic view illustrating a displacement of sampling of a trailing edge;

FIGS. 36A to 36I are time charts illustrating operation of the bias removal circuit and the AGC circuit of FIG. 34.

DESCRIPTION OF THE PREFERRED EMBODIMENT

Figure 1:
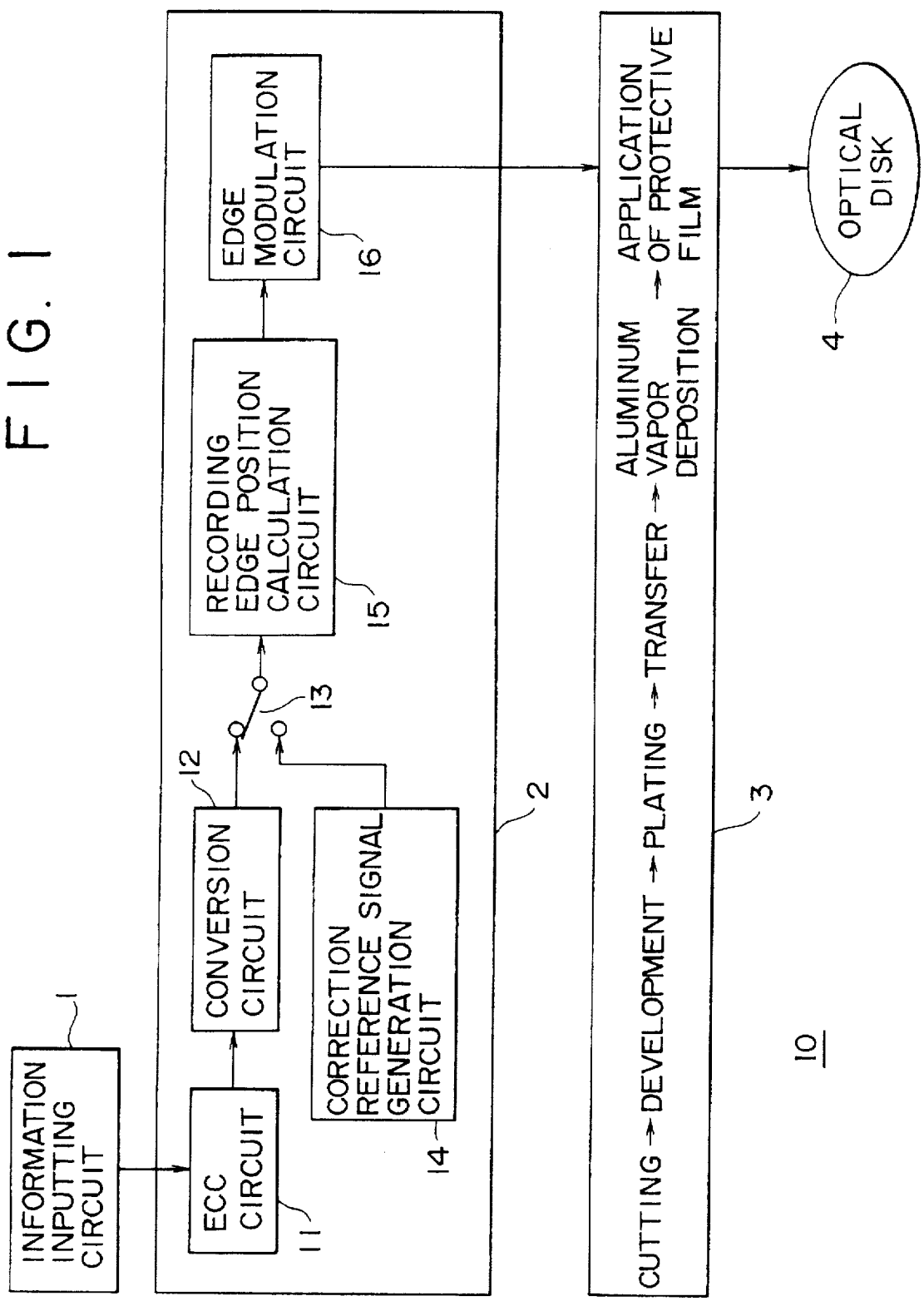
FIG. 1 is a block diagram showing a recording apparatus to which the present invention is applied.

Referring first to FIG. 1, there is shown an example of a construction of a recording apparatus to which the present invention is applied. Recording data outputted from an information inputting circuit 1 is inputted to an error correction detection (ECC) circuit 11 of an encoder 2, by which a code for error detection and correction is added to the recording data. Then, the data to which the code for error detection and correction is added is supplied to a conversion circuit 12, by which it is converted into data in units of 3 bits. In particular, in the present recording apparatus, each of the positions of the leading edge and the trailing edge of a pit is basically shifted stepwise from a reference position to one of eight positions from 0 to 7 to record data as described hereinabove with reference to FIGS. 29 to 32. Since such eight positions are represented by 3 bits, the recording data is converted into data in units of 3 bits.

Figure 29:
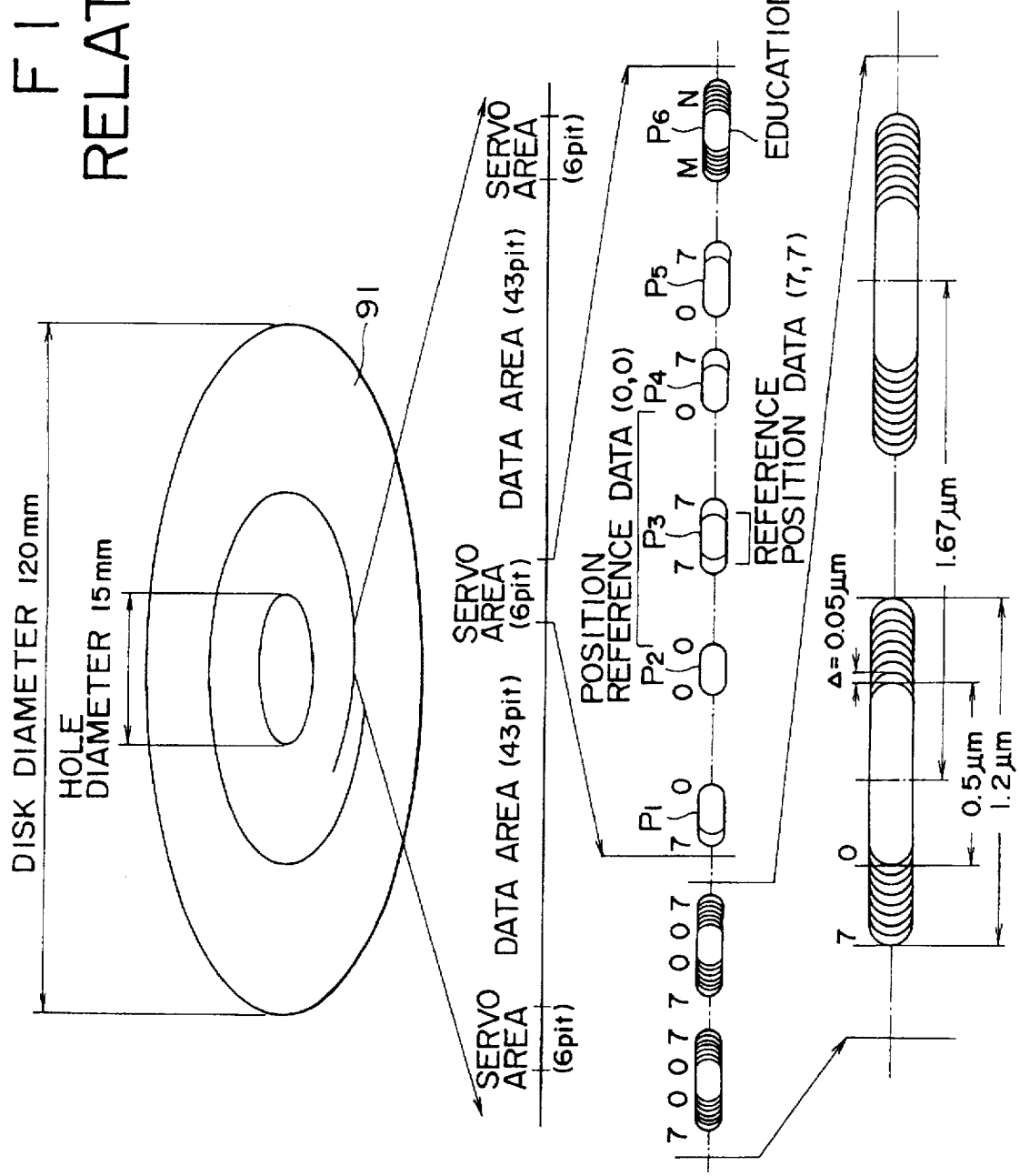
FIG. 29 is a diagrammatic view showing a format of an optical disk proposed formerly by the assignee of the present invention.
Figure 30:
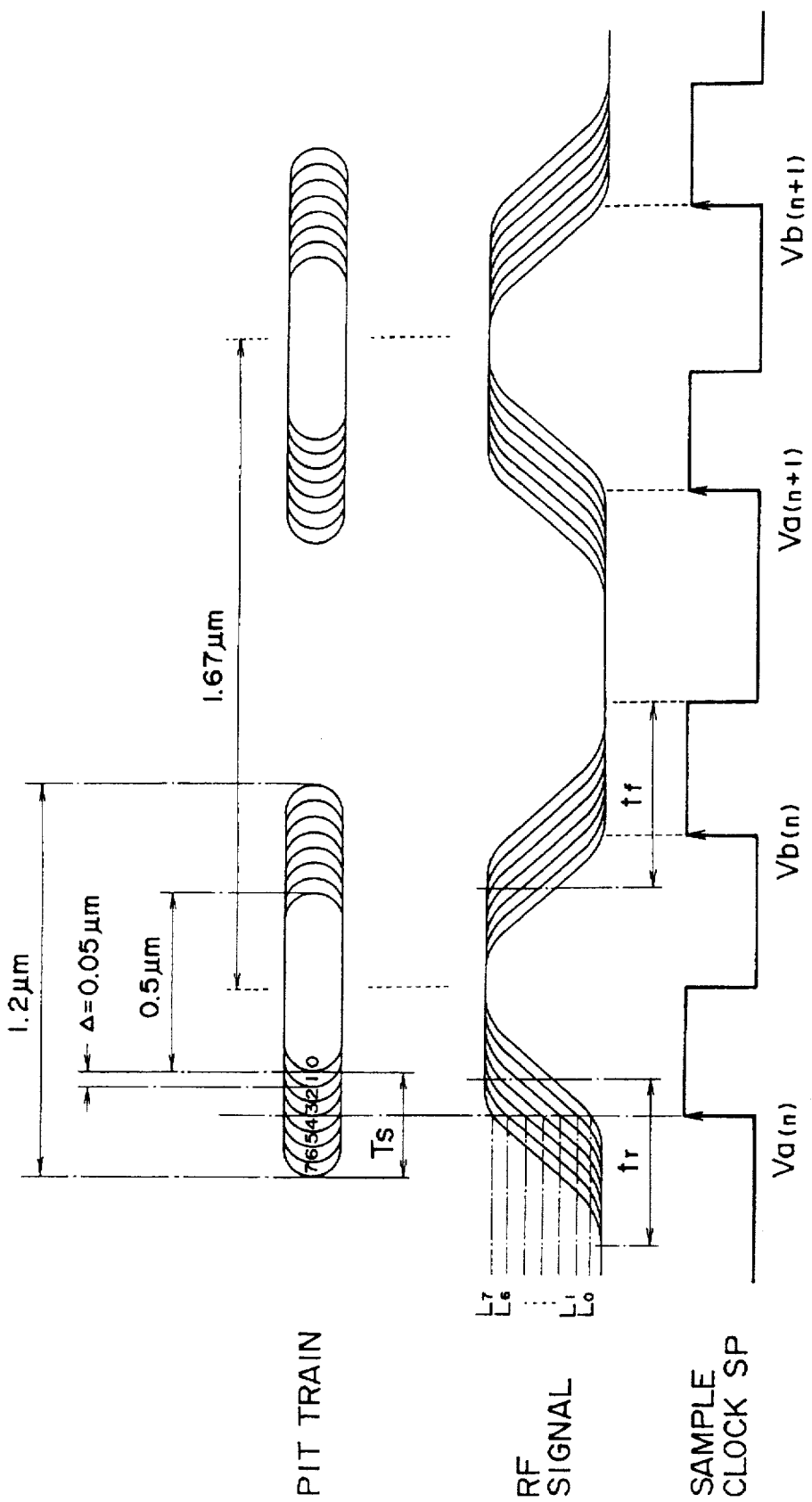
FIG. 30 is a time chart illustrating a principle of reproduction of the optical disk shown in FIG. 29.
Figure 31:
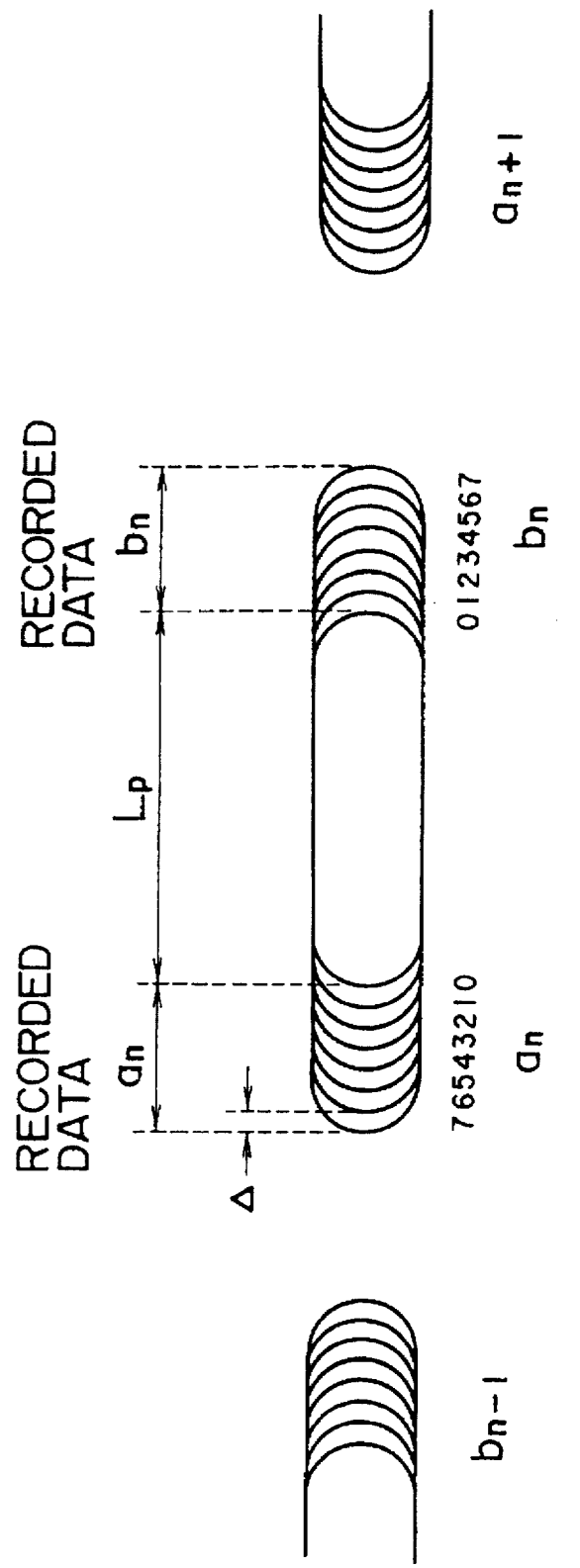
FIG. 31 is a diagrammatic view illustrating variations of the position of an edge of a pit.
Figure 32:
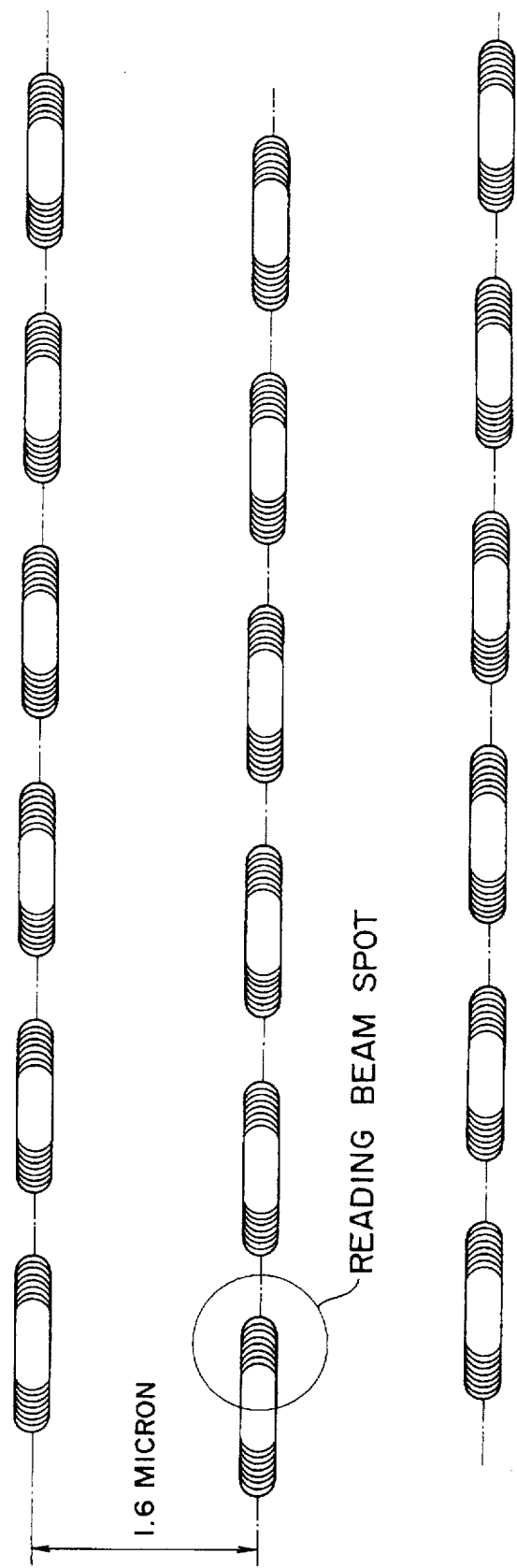
FIG. 32 is a diagrammatic view illustrating a condition of arrangement of pits in adjacent tracks.

The data outputted from the conversion circuit 12 is supplied to a recording edge position calculation circuit 15 by way of a switch 13. The recording edge position calculation circuit 15 calculates an edge position corresponding to the data inputted thereto and outputs a signal corresponding to the edge position to an edge modulation circuit 16. In particular, as seen in FIG. 29, a signal corresponding to one of the eight shift positions of 0 to 7 is outputted to the edge modulation circuit 16.

The edge modulation circuit 16 outputs a recording signal to a mastering apparatus 3 so that a pit having an edge corresponding to the signal inputted thereto may be formed.

Meanwhile, a correction reference signal generation circuit 14 generates a predetermined reference signal and outputs the reference signal to the recording edge position calculation circuit 15 by way of the switch 13.

Figure 2:
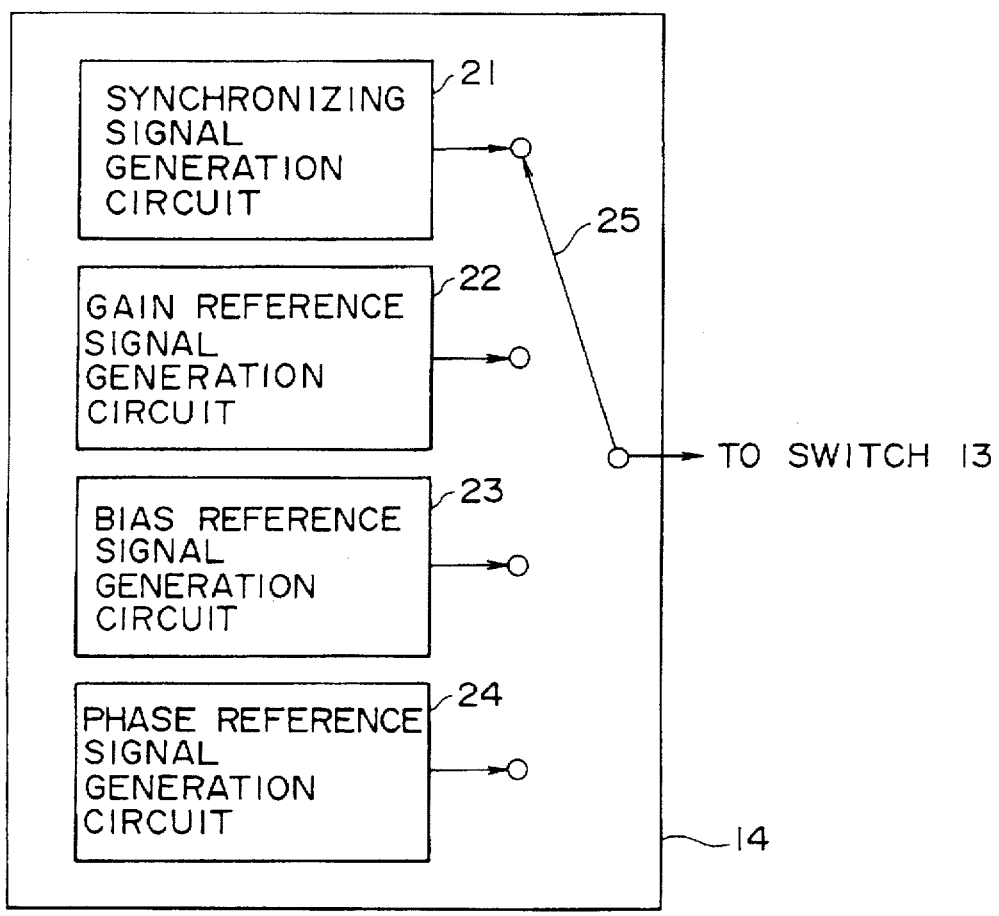
FIG. 2 is a block diagram showing an example of a construction of a correction reference signal generation circuit shown in FIG. 1.

FIG. 2 shows an example of a construction of the correction reference signal generation circuit 14. Referring to FIG. 2, in the construction shown, the correction reference signal generation circuit 14 includes a synchronizing signal generation circuit 21 for generating a synchronizing signal ((-1, -1) signal in FIG. 5 which will be hereinafter described) which makes a reference in production of a sampling clock, and a phase reference signal generation circuit 24 for generating a phase reference signal ((1, 3, 6) and (6, 3, 1) signals in FIG. 5) which makes a reference for fine adjustment of the phase of a sampling clock. The correction reference signal generation circuit 14 further includes a gain reference signal generation circuit 22 for generating a gain reference signal for generation of reference position data (7, 7) ((7, 7) signal in FIG. 5) illustrated in FIG. 29, and a bias reference signal generation circuit 23 for generating a bias reference signal for generation of reference position data (0, 0) ((0, 0) signal in FIG. 5) illustrated in FIG. 29.

A switch 25 selects one of signals outputted from the synchronizing signal generation circuit 21, the gain reference signal generation circuit 22, the bias reference signal generation circuit 23 and the phase reference signal generation circuit 24 and outputs the selected signal to the switch 13.

Figure 3:
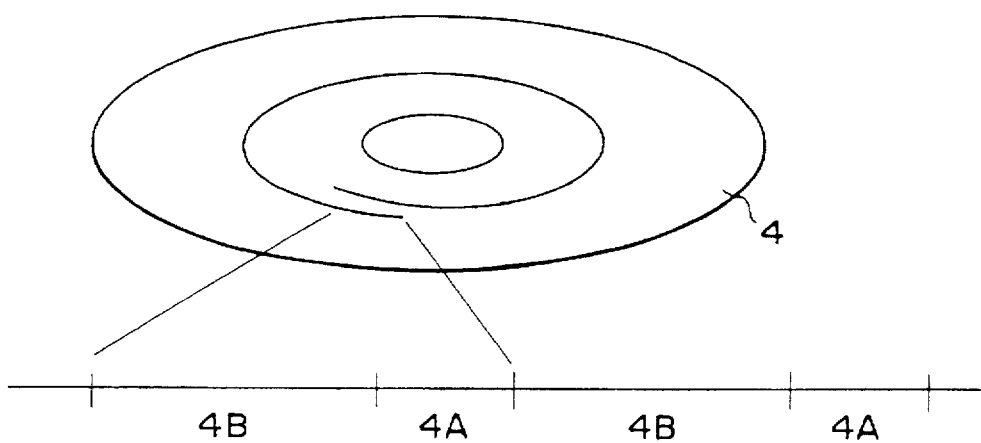
FIG. 3 is a schematic diagrammatic view illustrating a recording area of an optical disk shown in FIG. 1.

As seen from FIG. 3, the reference signals are periodically generated at timings of reference signal areas 4A of an optical disk 4. In other words, the switch 13 in FIG. 1 is changed over to the upper side in FIG. 1 at a timing at which data is recorded into a data area 4B of FIG. 3, but is changed over to the lower side in FIG. 1 at another timing at which data is recorded into a reference signal area 4A of FIG. 3.

In other words, the reference signal areas 4A correspond to the servo areas shown in FIG. 29 while the data areas 4B correspond to the data areas shown in FIG. 29.

Referring back to FIG. 1, the signal outputted from the edge modulation circuit 16 of the encoder 2 is supplied to the mastering apparatus 3. In the mastering apparatus 3, cutting processing is performed in accordance with the output of the edge modulation circuit 16. In particular, a predetermined master disk is prepared, and a laser beam is irradiated upon the master disk in response to the recording signal outputted from the edge modulation circuit 16 to form latent pits corresponding to the recording signal on the master disk. Then, the master disk is developed to convert such latent pits into actual pits, and plating is performed for the master disk, whereafter the plated layer is peeled off from the master disk to complete a stamper.

The pits formed on the stamper are transferred to a synthetic resin member. Such transfer can be performed, for example, by injecting a molten synthetic resin material into the stamper and then hardening the synthetic resin. Or else, such transfer can be performed by applying a UV resin material to the stamper and irradiating UV light upon the UV resin to harden the UV resin.

Figure 5:
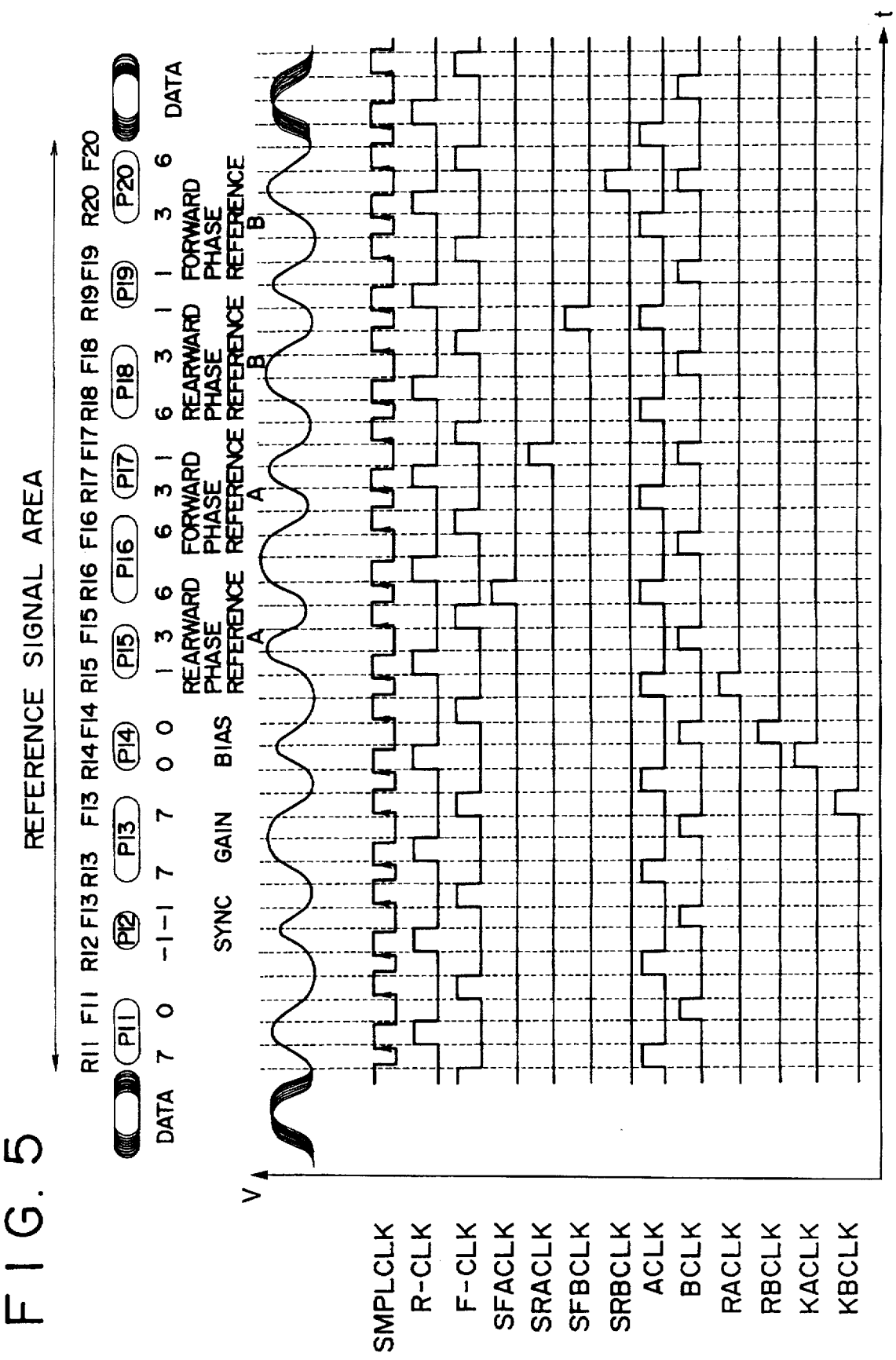
FIG. 5 is a time chart illustrating operation of the reproducing apparatus of FIG. 4.

The synthetic resin member to which the pits have been transferred in this manner is peeled off from the stamper, and an aluminum film is vapor deposited on the synthetic resin member. Then, a protective film is applied to the aluminum film, thereby completing the optical disk 4 (in the reference signal area 4A of which such pits as shown in FIG. 5 which will be hereinafter described are formed).

Naturally, it is also possible to record data not only on an optical disk but on a magneto-optical disk similarly as in the prior art. In this instance, marks are formed as pits.

Figure 4:
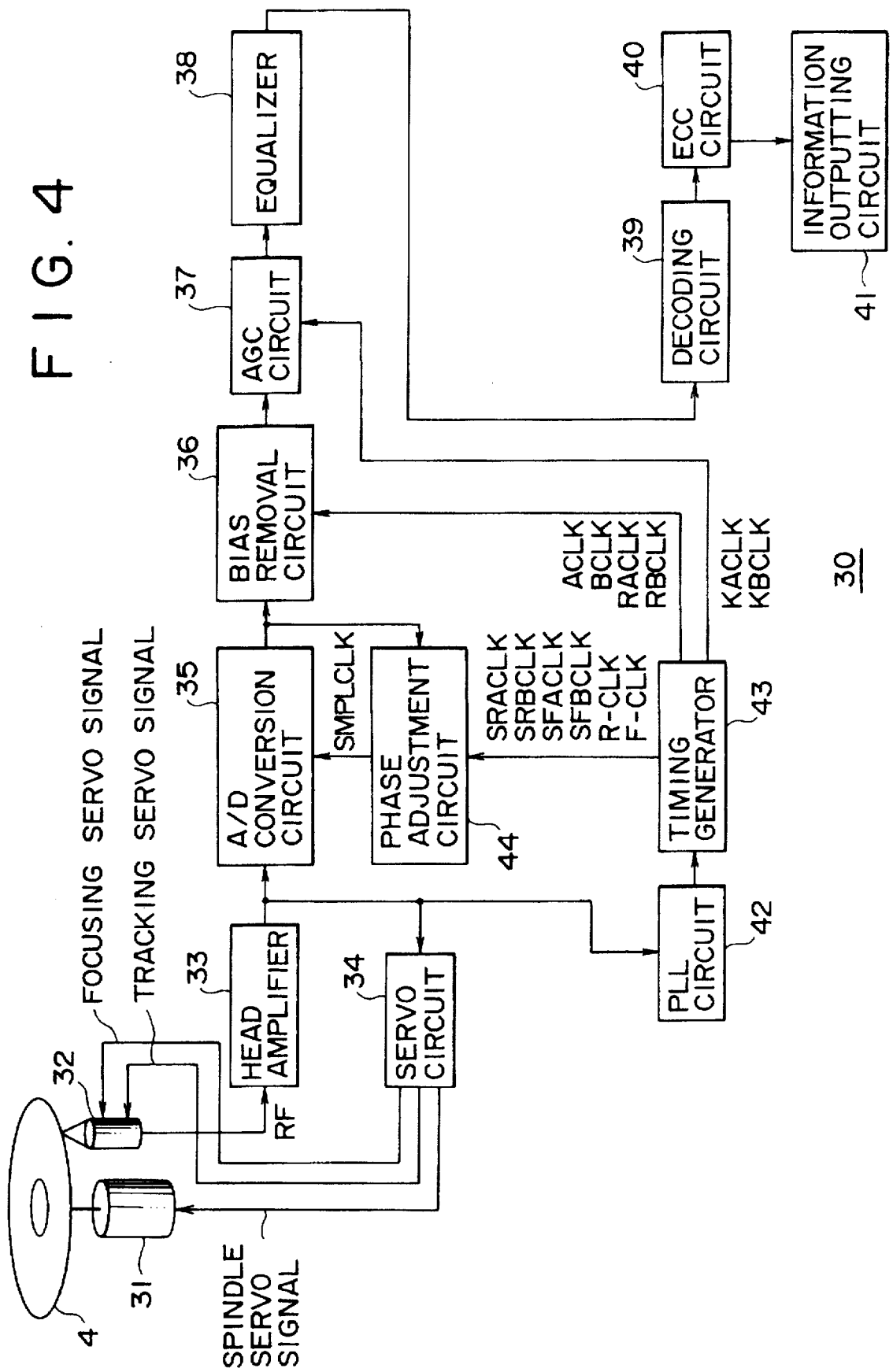
FIG. 4 is a block diagram showing a reproducing apparatus to which the present invention is applied.

FIG. 4 shows an example of a construction of a reproduction apparatus for the optical disk 4 produced in this manner. Referring to FIG. 4, in the reproduction apparatus shown, the optical disk 4 is rotated at a predetermined speed by a spindle motor 31. A pickup 32 irradiates a laser beam upon the optical disk 4 and reads data recorded on the optical disk 4 from reflected light from the optical disk 4. Then, the pickup 32 outputs an RF signal corresponding to the thus read signal to a head amplifier 33. The head amplifier 33 amplifies the RF signal thus inputted thereto and outputs the amplified signal to a servo circuit 34, an A/D conversion circuit 35 and a PLL (phase locked loop) circuit 42.

The servo circuit 34 produces a focusing servo signal and a tracking servo signal from the RF signal inputted thereto and outputs the thus produced servo signals to the pickup 32. The pickup 32 executes focusing control in response to the focusing servo signal inputted thereto, and executes tracking control in response to the tracking servo signal inputted thereto. Meanwhile, the servo circuit 34 produces a spindle servo signal and outputs it to the spindle motor 31. The spindle motor 31 is driven in accordance with the spindle servo signal.

In the meantime, the PLL circuit 42 detects a synchronizing signal ((-1, -1) signal in FIG. 5 which will be hereinafter described) from the RF signal inputted thereto. In particular, as described hereinabove, the position of an ordinary pit is set to one of the eight positions of 0 to 7. On the other hand, the position of -1 is an edge position which is not present in recording data in the data areas 4B. In other words, the position of -1 is an edge position which appears only in the reference signal areas 4A. Accordingly, the PLL circuit 42 detects the unique edge position as a synchronizing signal. Then, the PLL circuit 42 produces a clock synchronized with the synchronizing signal and outputs the clock to a timing generator 43.

The timing generator 43 produces an R-CLK signal, an F-CLK signal, an SFACLK signal, an SRACLK signal, an SFBCLK signal and an SRBCLK signal in synchronism with the clock supplied thereto from the PLL circuit 42 and outputs the thus produced signals to a phase adjustment circuit 44 as shown in FIG. 5.

The phase adjustment circuit 44 produces a sampling clock SMPLCLK from the signals received from the timing generator 43 and a signal inputted thereto from the A/D conversion circuit 35, and outputs the sampling clock SMPLCLK to the A/D conversion circuit 35. The A/D conversion circuit 35 samples the RF signal inputted thereto from the head amplifier 33 in synchronism with the sampling clock SMPLCLK and outputs a thus sampled value.

Here, a principle of fine adjustment of the phase of a sampling clock for use to sample an RF signal at a leading edge in the reproduction apparatus will be described with reference to FIGS. 6 to 8C.

Now, two successive pits Pa and Pb on the optical disk 4 as shown in FIG. 6 are considered. The trailing edge of the preceding pit Pa is represented by Fa, and the leading edge and the trailing edge of the succeeding pit Pb are represented by Rb and Fb, respectively. Then, if it is assumed that the leading edge Rb of the pit Pb is fixed to a predetermined position while each of the edges Fa and Fb is varied to one of the eight different positions from position 0 to position 7, then the RF signal outputted from the head amplifier 33 varies in such a manner as seen in FIG. 6.

In particular, where the time of a correct timing at which the edge Rb is to be sampled is represented by T2; another time prior in time to the time T2 is represented by T1; and a further time later than the time T2 in time is represented by T3, the level of the reproduction signal at the time T1 increases as the position of the edge Fa approaches the position 7, but decreases as the position of the edge Fa approaches the position 0. On the other hand, the level at the time T3 decreases as the edge Fb approaches position 0, but increases as the edge Fb approaches the position 7. In contrast, the sample value at the time T2 is fixed irrespective of the positions of the edges Fa and Fb.

Accordingly, if, for example, the edges Rb and Fb are fixed while the edge Fa is varied as seen from FIG. 7A, then when the position of the edge Fa is varied to a value proximate to 7, the RF signal obtained then is such as a signal RF1 shown in FIG. 7A, but when the position of the edge Fa is varied to another value proximate to 0, the RF signal obtained then is such as a signal RF2 shown in FIG. 7B. The level at the time T1 is hither with the signal RF1 than with the signal RF2. At the time T3, the signals RF1 and RF2 exhibit an equal value.

In contrast, if, for example, the edges Fa and Rb are fixed while the edge Fb is varied as seen from FIG. 7B, then when the position of the edge Fb is proximate to 0, the RF signal obtained then is such as a signal RF3 shown in FIG. 7B, but when the position of the edge Fb is proximate to 7, the RF signal obtained then is such as a signal RF4 shown in FIG. 7B. The level at the time T3 is higher with the signal RF4 than with the signal RF3, but at the time T1, the signals RF3 and RF4 exhibit an equal value.

FIGS. 8A to 8C show different edge positions. Now, if the position of the edge Rb is 3, the position of the edge Fa is 6 and the position of the edge Fb is 1 as seen in FIG. 8A, then a signal RF5 is obtained as a reproduction signal.

On the other hand, if the position of the edge Rb is 3, the position of the edge Fa is 1 and the position of the edge Fb is 6 as seen in FIG. 8B, then the reproduction signal obtained then is such as a signal RF6 shown in FIG. 8B.

In other words, while the edge positions in the case shown in FIG. 8A have a pattern of the position 6, the position 3 and the position 1, the edge positions shown in FIG. 8B have another pattern of the position 1, the position 3 and the position 6. In short, the pattern shown in FIG. 8B is complementary to the pattern shown in FIG. 8A.

FIG. 8C collectively shows the signals RF5 and RF6 shown in FIGS. 8A and 8B. The levels of the signals RF5 and RF6 at the correct sampling time T2 at the position 3 exhibit an equal value. If the sampling time is displaced from the time T2 to the time T1 which is prior in time to the time T2, then the level of the signal RF5 becomes a higher level than the level of the signal RF6. On the other hand, if the sampling time is displaced to the time T3 later than the time T2, then the level of the signal RF6 becomes higher than the level of the signal RF5.

Accordingly, if, for example, the signal RF6 is subtracted from the signal RF5, then if the sampling time coincides with the correct time T2, then the difference value is 0, but if the sampling time coincides with the time T1 prior to the correct time T2, the difference value exhibits a positive sign, and on the contrary if the sampling time coincides with the time T3 later than the time T2, the difference value exhibits a negative sign. Then, as the displacement in time increases, the absolute value of a negative or positive value increases. Accordingly, by calculating a difference between the signals RF5 and RF6, a displacement amount in timing (displacement in phase) of the sampling time can be detected from the difference.

If four patterns from which the signals RF1 to RF4 shown in FIGS. 7A and 7B are obtained are formed, then calculation of the difference between the signals RF1 and RF2 proves that the sampling time at the edge Rb is displaced forwardly in time. Meanwhile, calculation of the difference of the signal RF4 from the signal RF3 proves that the sampling time is the time T3 displaced backwardly from the regular time T2.

However, in order to detect a displacement in timing in this manner, four fixed patterns are required. Even if the patterns of the signals RF1 and RF3 are made same as each other, three patterns are still required.

On the other hand, if two complementary patterns are prepared as shown in FIGS. 8A to 8C, then the direction and the degree of a displacement can be discriminated with the two complementary patterns.

Such complementary relationship will be described generally. When the pattern of the positions of three successive edges which includes a far shift position (in the example shown in FIG. 8A, the position 6), a predetermined discrimination position (in the example shown in FIG. 8A, the position 3) and a near shift position (in the example shown in FIG. 8A, the position 1) is determined as a first position, the second pattern signifies that the positions of three successive edges are set to a near position (in the example shown in FIG. 8B, the position 1), a discrimination position (in the example shown in FIG. 8B, the position 3) and a far position (in the example shown n FIG. 8B, the position 6).

FIGS. 9 and 10A to 10C illustrate a displacement in timing of sampling of a trailing edge, and correspond to FIGS. 6 and 8A to 8C which illustrate a displacement in timing of sampling of a leading edge, respectively.

If the time of a correct timing at which the edge Fc is to be sampled is represented by T5; the time prior in time to the time T5 is represented by T4; and the time later than the time T5 is represented by T6 as seen in FIG. 9, then the level of the reproduction signal at the time T4 decreases as the position of the edge Rc approaches the position 0, but increases as the position of the edge Rc approaches the position 7. On the other hand, the level at the time T6 approaches as the position of the edge Rd approaches the position 7, but decreases as the position of the edge Rd approaches the position 0. In contrast, the sample value at the time T5 is fixed irrespective of the positions of the edges Rc and Rd.

Figure 10A:
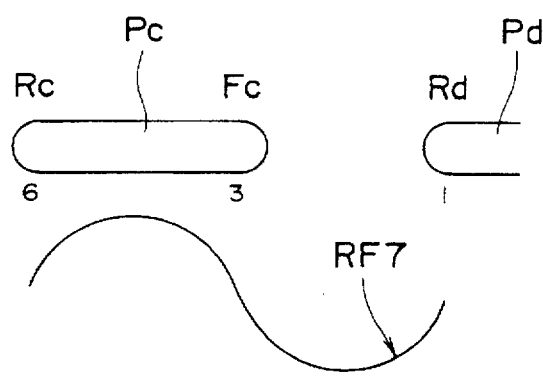
FIGS. 10A, 10B and 10C are diagrammatic views illustrating a displacement of sampling of a trailing edge.
Figure 10B:
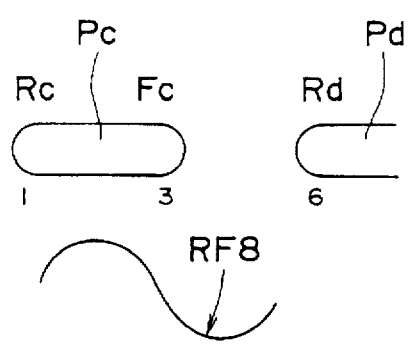

Thus, for example, the leading edge Rc of the pit Pc is set to the position 6, the trailing edge Fc of the pit Pc is set to the position 3 and the leading edge Rd of the pit Pd is set to the position 1 as shown in FIG. 10A to form a first pattern. Similarly, three successive edges are formed at the position 1, the position 3 and the position 6 to form a complementary pattern as shown in FIG. 10B.

Figure 10C:
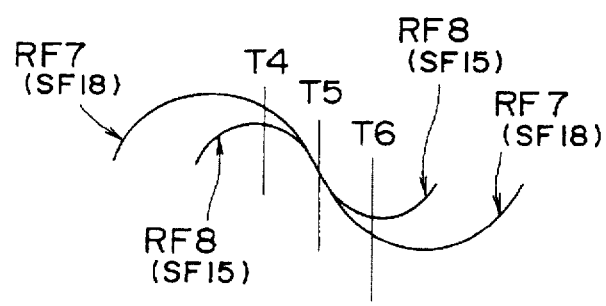

The variations of an RF signal obtained by reproduction of the two patterns are shown in FIG. 10C. In particular, when sampled at the time T5, the sample values of a signal RF7 as an RF signal obtained by reproduction of the first pattern shown in FIG. 10A and another signal RF8 as an RF signal obtained by reproduction of the second pattern shown in FIG. 10B exhibit an equal value.

On the other hand, when the sampling time coincides with the time T4 prior to the regular time T5, the signal RF7 exhibits a higher sample value than the signal RF8. On the contrary, when the sampling time coincides with the time T6 later than the regular time T5, the signal RF8 exhibits a higher value than the signal RF7. Accordingly, similarly as in detection of a displacement of sampling of a leading edge, a displacement of a sampling phase of a trailing edge can be detected by calculation of the difference between the signals RF7 and RF8.

Based on the principle described above, pits P11 to P20 are formed in each reference signal area 4A of the optical disk 4 as shown in FIG. 5. The pit P11 may be a dummy pit or the education pit P6 shown in FIG. 29. Where the pit P11 is used as the education pit, the correction reference signal generation circuit 14 shown in FIG. 2 must include an education signal generation circuit (not shown).

The pit P12 is formed so that the positions of the opposite edges thereof are set to (-1, -1). In other words, the edges R12 and F12 of the pit P12 constitute a synchronizing signal.

The pit P13 is formed so that the positions of the opposite edges R13 and F13 are set to (7, 7) and provides a gain reference signal.

The edges R14 and F14 of the pit P14 are positioned to (0, 0) and provide a bias reference signal.

The edges R15 to F20 of the pits P15 to P20 are positioned to the position 1, position 3, position 6, position 6, position 3, position 1, position 6, position 3, position 1, position 1, position 3 and position 6, respectively. In particular, the pattern (position 1, position 3 and position 6) for phase correction of a trailing edge constituted from the edges R15, F15 and R16 is complementary to the pattern (position 6, position 3 and position 1) constituted from the edges R18, F18 and R19. Similarly, the pattern (position 6, position 3 and position 1) for phase correction of a leading edge constituted from the edges F16, R17 and F17 is complementary to the pattern (position 1, position 3 and position 6) constituted from the edges F19, R20 and F20.

Figure 11:
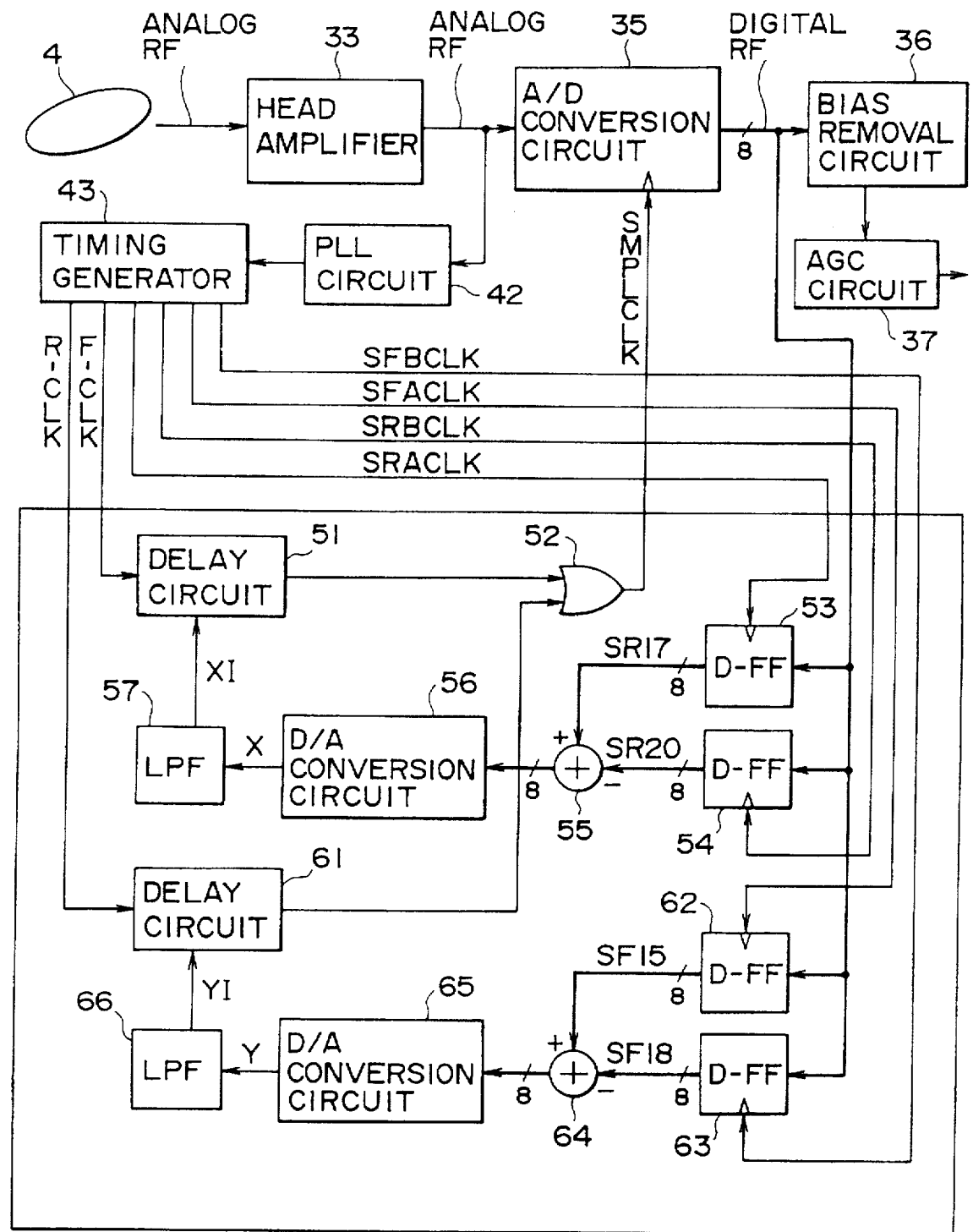
FIG. 11 is a block diagram showing an example of a construction of a phase adjustment circuit shown in FIG. 4.

FIG. 11 shows an example of a construction of the phase adjustment circuit 44 for detecting a phase displacement of a sampling clock and finely adjusting the phase of the sampling clock in accordance with the principle described above. Referring to FIG. 11, an F-CLK signal generated at the timing of the trailing edge of each pit from the timing generator 43 is inputted to a delay circuit 51, by which it is delayed by a predetermined time in accordance with a control signal XI outputted from a low-pass filter (LPF) 57 to form a sampling clock R-SMPLCLK for sampling a reproduction signal at the leading edge. The sampling clock is inputted to the A/D conversion circuit 35 by way of an OR circuit 52. In response to the sampling clock inputted thereto, the A/D conversion circuit 35 samples the reproduction level at the leading edge of the analog RF signal inputted thereto from the head amplifier 33.

Of the sample values outputted from the A/D conversion circuit 35, a sample value SR17 of the edge R17 is latched as a reference signal for correction of a phase displacement of the leading edge into a D-FF (D-type flip-flop) 53. This is realized by the timing generator 43 generating an SRA-CLK signal at the timing at which the A/D conversion circuit 35 outputs the sample value SR17 (FIG. 5).

Similarly, the timing generator 43 supplies an SRBCLK signal to another D-FF 54 at the timing at which the A/D conversion circuit 35 outputs a sample value SR20 of the edge R20 (FIG. 5). Consequently, the sample value SR20 is held by the D-FF 54.

A subtraction circuit 55 subtracts the sample value SR20 held in the D-FF 54 from the sample value SR17 held in the D-FF 53 and outputs a resulted difference to a D/A conversion circuit 56. As described hereinabove, the difference here corresponds to the difference between the signals RF6 and RF5 shown in FIG. 8C. The D/A conversion circuit 56 converts the difference signal from a digital signal into an analog signal X and outputs the analog signal X to the low-pass filter (LPF) 57. The low-pass filter 57 smoothes the signal inputted thereto and outputs a resulted signal as a control signal XI to the delay circuit 51.

Figure 12:
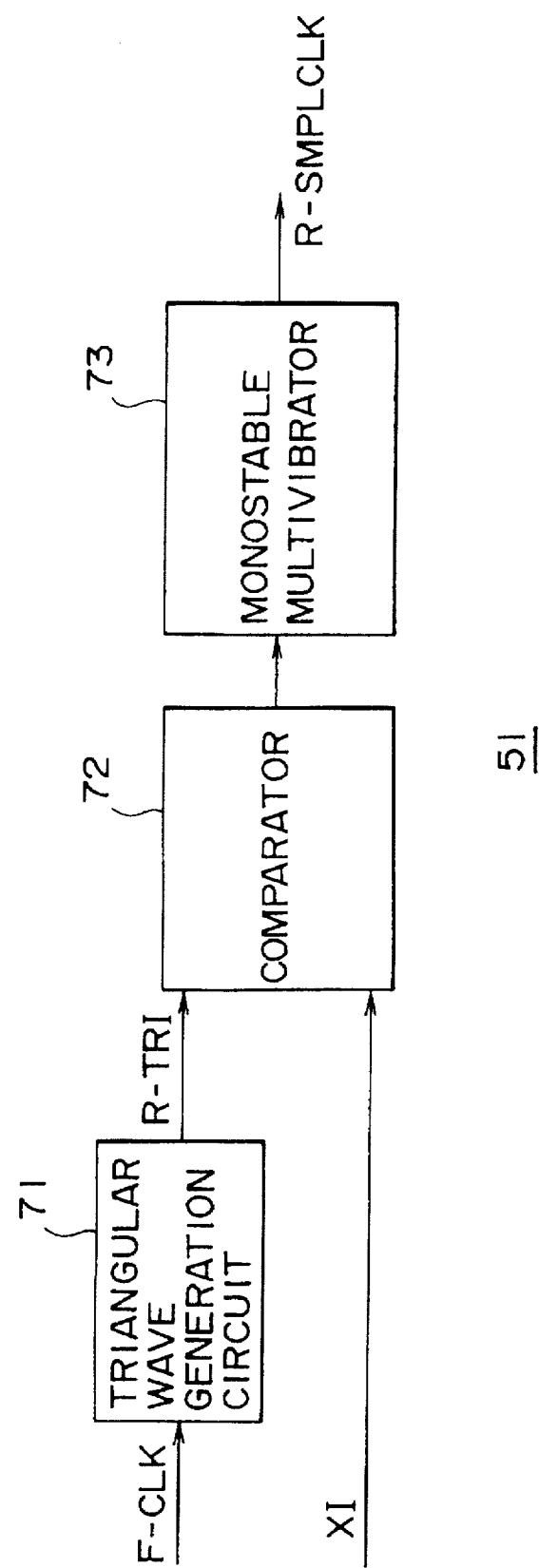
FIG. 12 is a block diagram showing an example of a delay circuit shown in FIG. 11.

Referring now to FIG. 12, the delay circuit 51 is constituted from, for example, a triangular wave generation circuit 71, a comparator 72 and a monostable multivibrator 73.

An F-CLK signal (this signal can be said substantially to be a sampling clock R-SMPLCLK for sampling a leading edge) generated at the timing of the trailing edge of each pit (refer to FIGS. 5 and 13) from the timing generator 43 is inputted to the triangular wave generation circuit 71. The triangular wave generation circuit 71 repeats charging and discharging operations such that it performs a discharging operation while the F-CLK signal of a high level is inputted thereto, but performs a charging operation while the F-CLK signal exhibits a low level. Consequently, the triangular wave generation circuit 71 generates a triangular wave R-TRI shown in FIG. 13. The triangular wave R-TRI exhibits a gradually increasing level while the F-CLK signal remains at a low level.

Figure 13:
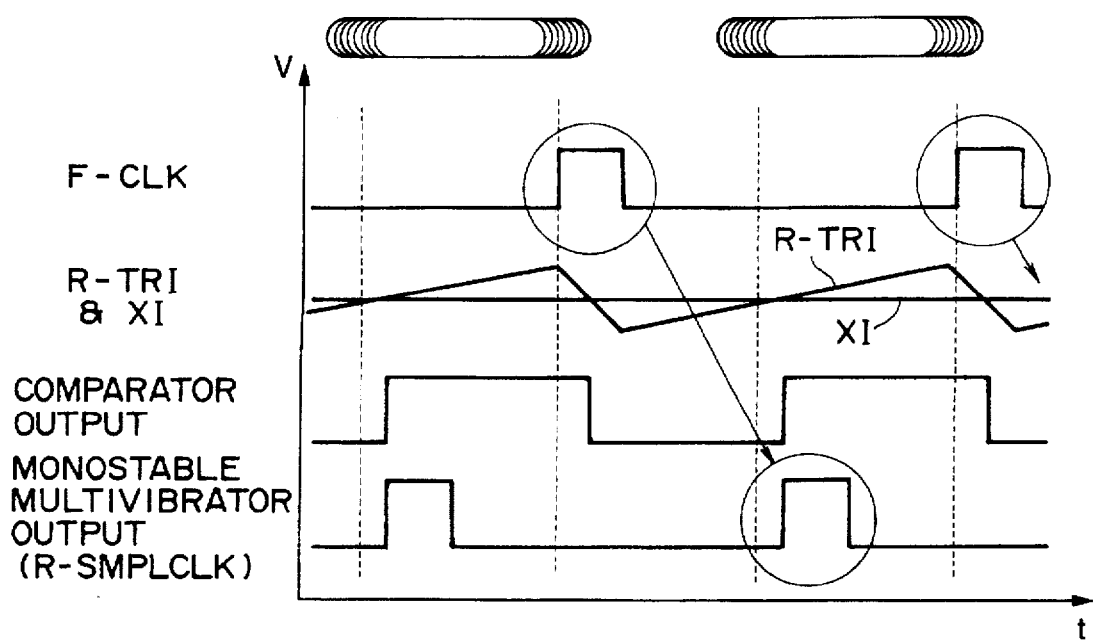
FIG. 13 is a time chart illustrating operation of the delay circuit of FIG. 12.

The comparator 72 compares the triangular wave R-TRI in magnitude with the control signal XI outputted from the low-pass filter 57 and outputs, when the triangular wave R-TRI is greater, a signal of a high level, but outputs a signal of a low level when the triangular wave R-TRI is smaller (refer to FIG. 13). The monostable multivibrator 73 is triggered by an edge at which the output of the comparator 72 varies from the low level to the high level, and outputs a pulse of a high level for a fixed period (refer to FIG. 13). The pulse is supplied as a sampling clock R-SMPLCLK for sampling a leading edge of a pit to the A/D conversion circuit 35 by way of the OR circuit 52.

As seen from FIG. 13, the sampling clock R-SMPLCLK for a leading edge outputted from the monostable multivibrator 73 is produced by delaying an F-CLK signal generated at the timing of a trailing edge by a predetermined time. Consequently, a phase displacement can be corrected in a wider range.

In particular, the level of the control signal XI outputted from the low-pass filter 57 is produced from a value obtained by subtracting the sample value SR20 (RF5 in FIGS. 8A and 8C) from the sample value SR17 (RF6 in FIGS. 8B and 8C). Consequently, the magnitude of the control signal XI increases as the phase of sampling advances to the time T1 prior to the regular time T2, but decreases as the phase of sampling retards to the time T3 later than the regular time T2.

As seen from FIG. 13, as the level of the control signal XI rises (as the position of the control signal XI comes to a higher position in FIG. 13), the generation timing of the sampling clock R-SMPLCLK outputted from the monostable multivibrator 73 is retarded (displaced rightwardly in FIG. 13). On the contrary, as the level of the control signal XI falls, the generation timing is advanced (moved leftwardly in FIG. 13). The rising edge of the sampling clock R-SMPLCLK is thus servo controlled so that it may be generated at the position (regular position) indicated by a vertical broken line in FIG. 13.

The range within which such servoing control is possible is defined as a range within which the triangular wave R-TRI shown in FIG. 13 intersects, within a gradually increasing range thereof, with the control signal XI. As seen from FIG. 13, the range over which the level of the triangular wave R-TRI gradually increases is greater than another range within which the level thereof decreases gradually. Accordingly, the adjustable range is wider as much.

Figure 14:
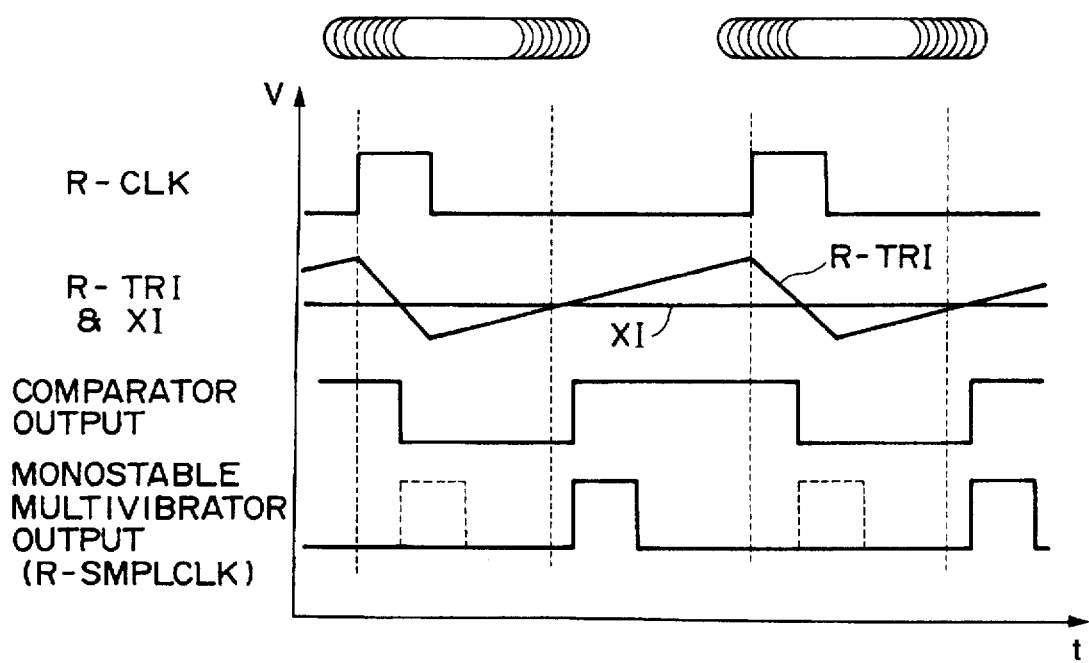
FIG. 14 s a time chart illustrating another operation of the delay circuit of FIG. 12.

In contrast, if the R-TRI signal is generated in response to the R-CLK signal generated at the timing of a leading edge of a pit as seen from, for example, FIG. 14 (FIG. 5), then if it is assumed that the monostable multivibrator 73 is triggered by a rising edge of the comparator 72, then the output of the monostable multivibrator 73 is generated at the timing of a trailing edge as seen from a solid line in FIG. 14. Accordingly, the pulse cannot be used as the sampling clock R-SMPLCLK for sampling a reproduction signal at a leading edge.

Thus, if the monostable multivibrator 73 is trigged in synchronism with a falling edge of the output of the comparator 72, the output of the monostable multivibrator 73 is produced as indicated by a broken line in FIG. 14. While this pulse is produced in the proximity of the leading edge of a pit, it cannot be generated on the position leftwardly of the reference position of the leading edge. In other words, while it is possible to retard a sampling clock, it is impossible to advance the sampling clock.

Therefore, a sampling clock R-SMPLCLK for sampling the leading edge of a pit is preferably generated based on an F-CLK signal (after delayed) generated at the timing of the trailing edge of a pit.

In this manner, the sampling clock R-SMPLCLK for sampling a leading edge, which is to be supplied to the A/D conversion circuit 35, is produced by delaying the F-CLK signal by a predetermined time by means of the delay circuit 51 in accordance with the difference in reproduction level between the edges R17 and R20 for fine phase adjustment of sampling clocks for the leading edge. In this instance, the F-CLK signal to be supplied to the delay circuit 51 is generated at the timing of the trailing edge of a pit by the timing generator 43. This, however, does not signify that phase adjustment of a sampling clock for phase adjustment of the trailing edge is performed corresponding to a signal for phase adjustment of the leading edge In particular, referring to FIG. 11, the F-CLK signal and the R-CLK signal generated by the timing generator 43 are produced in synchronism with a synchronizing signal before A/D conversion by the A/D conversion circuit 35. In other words, the F-CLK signal and the R-CLK signal are not influenced by phase correction. Accordingly, although the F-CLK signal is generated at the generation timing of the trailing edge of a pit and the R-CLK signal is generated at the generation timing of the leading edge of a pit (FIG. 5), those signals are merely generated at the timings of the respective corresponding edges, and even if the F-CLK signal is generated at the generation timing of the trailing edge, this is not used as a sampling clock for a trailing edge but is used as a sampling clock for a leading edge. Similarly, although the R-CLK signal is generated at the generation timing of the leading edge, it is not used as a sampling clock for a leading edge but is used as a sampling clock for a trailing edge.

While the foregoing description relates to fine adjustment of the phase of the sampling clock R-SMPLCLK for a leading edge, also fine adjustment of the phase of the sampling clock F-SMPLCLK for a trailing edge is performed in a similar manner. However, this phase adjustment is performed independently of the sampling clock R-SMPLCLK for a leading edge. This is because, while the degrees of displacement in phase of the sampling clocks are not unrelated to each other, they are independent of each other.

Therefore, a D-FF 62 and another D-FF 63 constituting the phase adjustment circuit 44 of FIG. 11 hold the sample values SF15 and SF18 of the edges F15 and F18 from the output of the A/D conversion circuit 35 in response to the SFACLK signal and the SFBCLK signal (generated at such timings as seen from FIG. 5), respectively. A subtraction circuit 64 subtracts the sample value SF18 (RF7 in FIG. 10) from the sample value SF15 (RF8 in FIG. 10) and outputs data corresponding to the difference between them to a D/A conversion circuit 65.

The D/A conversion circuit 65 converts the data inputted thereto from digital data into analog data to produce a signal Y of an analog level corresponding to the magnitude of the difference. A low-pass filter 66 smoothes the signal Y to produce a control signal YI. The control signal YI is supplied to a delay circuit 61.

Figure 15:
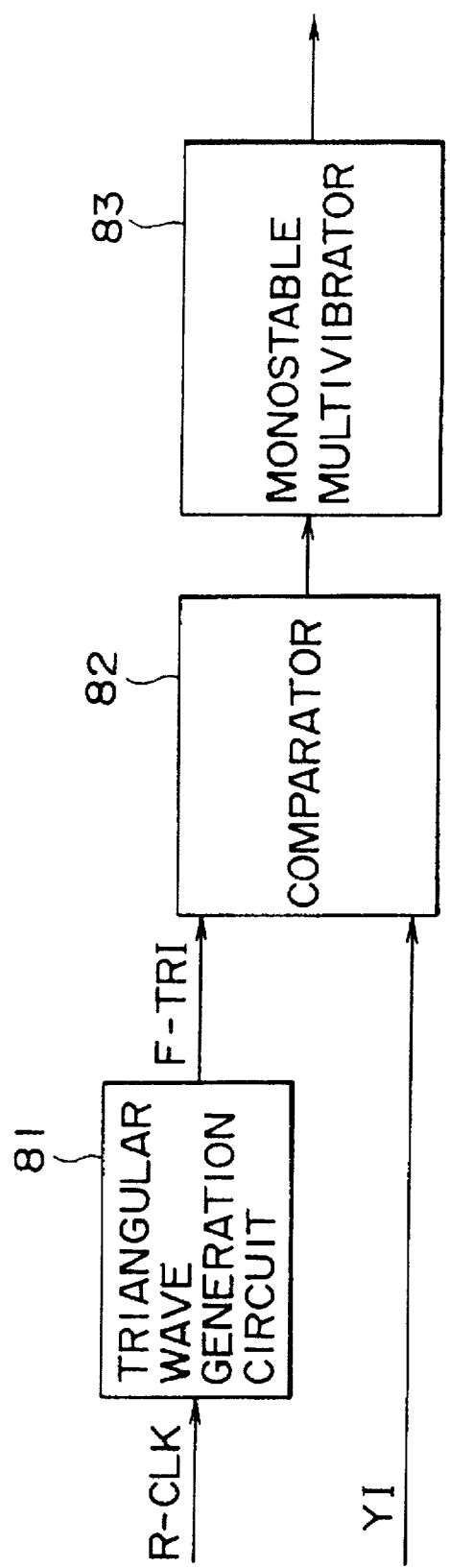
FIG. 15 s a block diagram showing an example of a construction of another delay circuit shown in FIG. 11.

FIG. 15 shows an example of a construction of the delay circuit 61. The delay circuit 61 has a basic construction similar to that of the delay circuit 51. In particular, referring to FIG. 15, a triangular wave generation circuit 81 performs a charging operation while the R-CLK signal generated at the generation timing of a leading edge from the timing generator 43 (refer to FIGS. 5 and 16) exhibits a high level, but performs a discharging operation while the R-CLK signal exhibits a low level, and outputs a triangular wave F-TRI.

Figure 16:
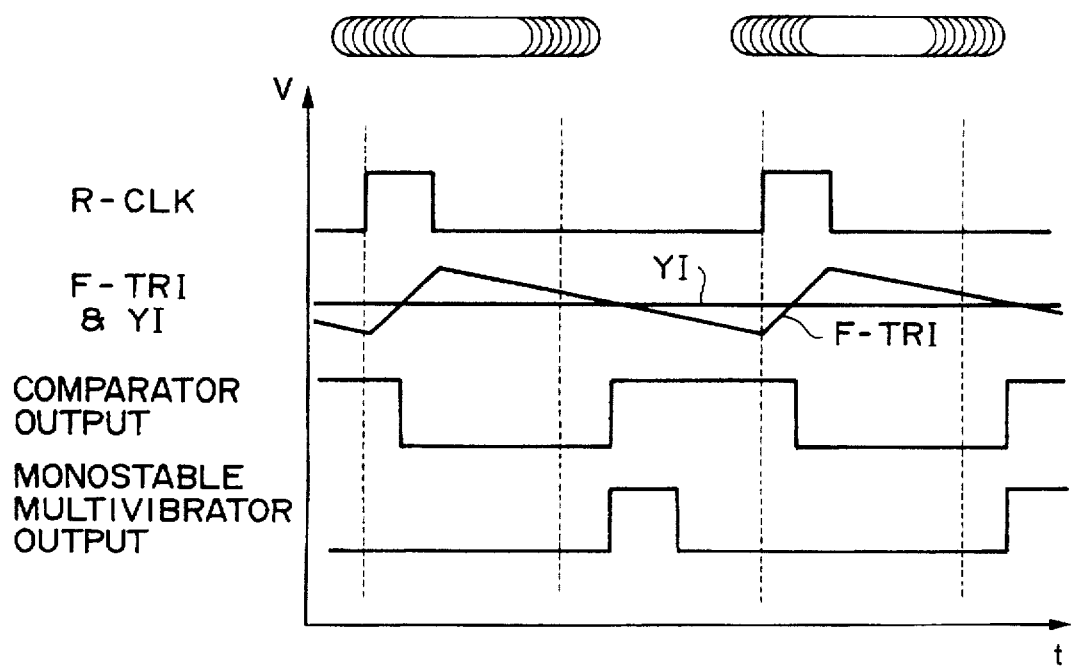
FIG. 16 is a time chart illustrating operation of the delay circuit of FIG. 15.

The comparator 82 compares the triangular wave F-TRI in magnitude (level) with the control signal YI outputted from the low-pass filter 66 and outputs, when the control signal YI is greater, a signal of a high level, but outputs a signal of a low level when the control signal YI is smaller (FIG. 16). Then, a monostable multivibrator 83 is triggered by a rising edge of the output of a comparator 82 and outputs a pulse of a high level for a fixed period as a sampling clock F-SMPLCLK for a trailing edge. The sampling clock is supplied to the A/D conversion circuit 35 by way of the OR circuit 52. The A/D conversion circuit 35 samples the value at a trailing edge of the analog RF signal inputted thereto from the head amplifier 33 at the timing of the sampling clock.

A difference signal outputted from the subtraction circuit 64 increases when the sample value SF15 is higher than the sample value SF18, that is, when the timing of sampling comes to the timing T6 later than the regular time T5 as seen from FIG. 10C, but decreases on the contrary when the timing of sampling comes to the time T4 prior to the regular time T5.

In contrast, when the level of the control signal YI rises in response to the difference signal as seen in FIG. 16, the position of the intersecting point thereof with the triangular wave F-TRI advances (moves leftwardly in FIG. 16). In other words, the sampling clock F-SMPLCLK outputted from the monostable multivibrator 83 advances in timing. On the contrary when the level of the control signal YI falls, the intersecting point thereof with the triangular wave F-TRI moves rightwardly in FIG. 16. Consequently, the sampling clock F-SMPLCLK outputted from the monostable multivibrator 83 retards in timing.

Servoing control is performed in such a manner as described above so that a sampling clock F-SMPLCLK for sampling a trailing edge is generated normally at a regular generation timing for a trailing edge.

Fine adjustment of the phase of the sampling clock SMPLCLK is performed in such a manner as described above, and the values of a reproduction level at a leading edge and a trailing edge of an RF signal are sampled at correct timings by the A/D conversion circuit 35. Each of the sample values is supplied to a bias removal circuit 36 of FIG. 4, by which a bias component is removed from the sample value, and the output of the bias removal circuit 36 is supplied to an AGC (automatic gain control) circuit 37, by which gain adjustment thereof is performed. For the bias adjustment and the gain adjustment, the edges R14 and F14 for bias adjustment and the edges R13 and F13 for gain adjustment are formed in each reference signal area as seen from FIG. 5. The bias removal circuit 36 and the AGC circuit 37 perform bias adjustment and gain adjustment, respectively, making use of the edges mentioned just above.

Figure 33:
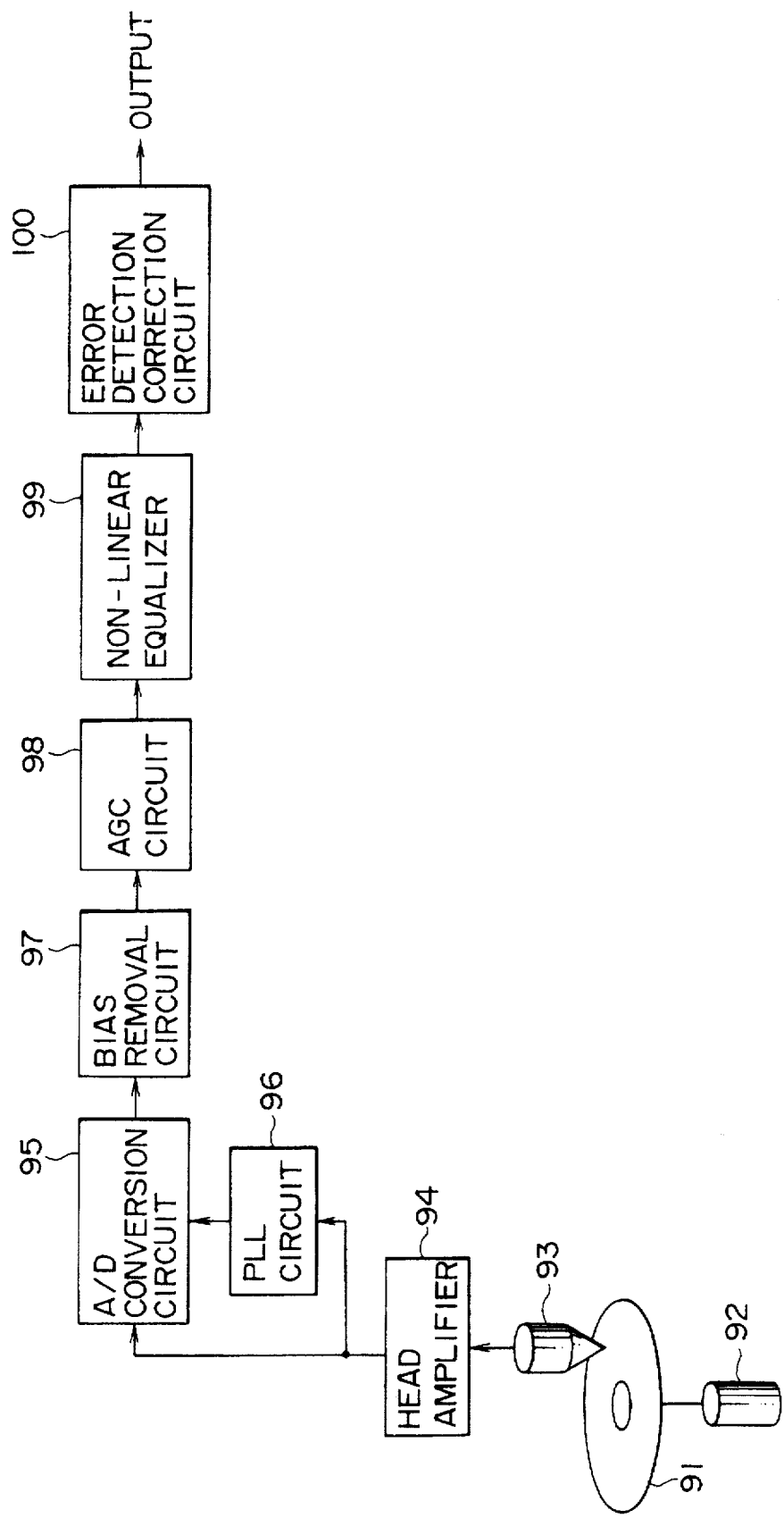
FIG. 33 is a block diagram showing an example of a construction of a conventional reproduction apparatus.
Figure 34:
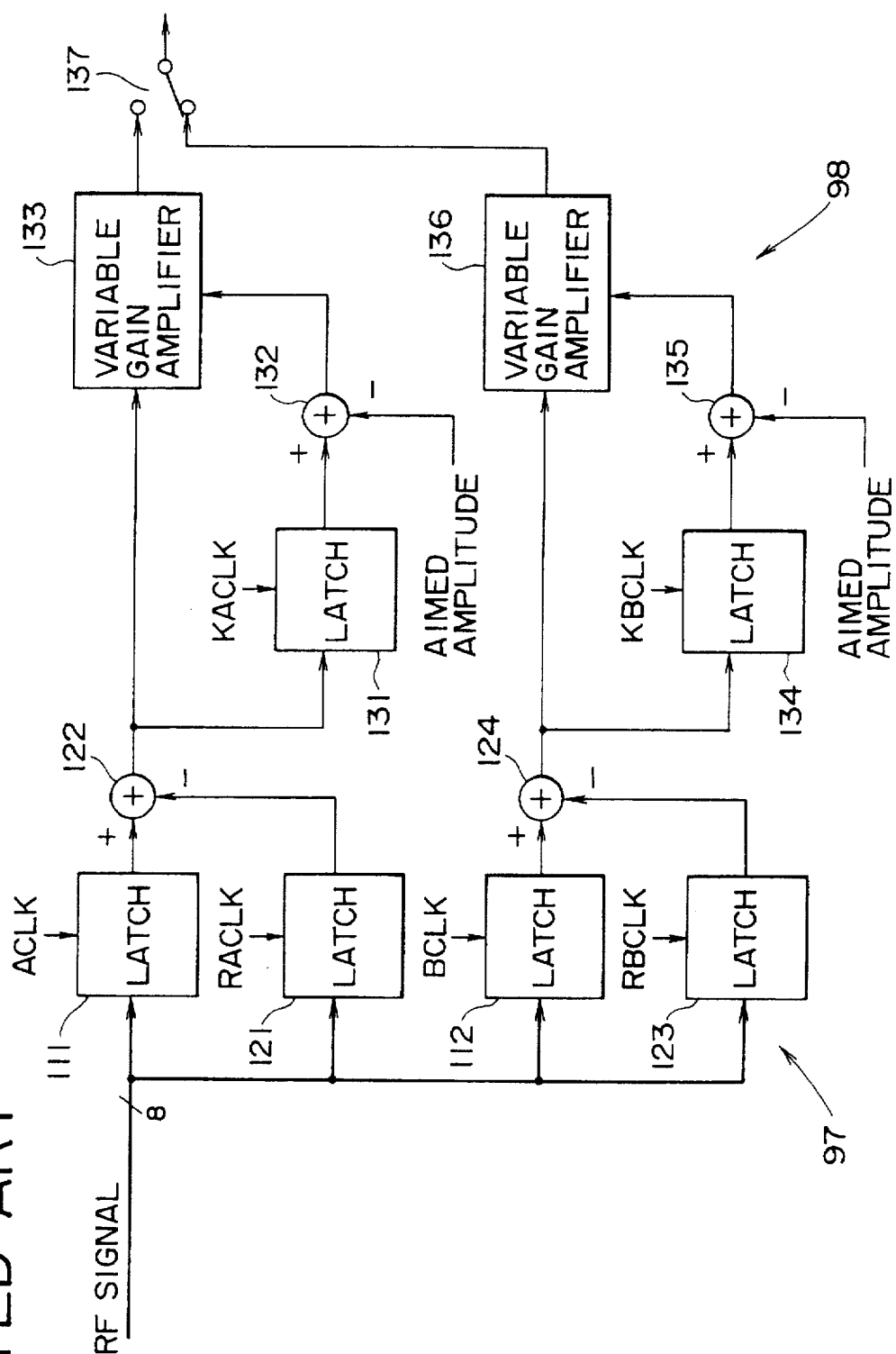
FIG. 34 is a block diagram showing an example of constructions of a bias removal circuit and an AGC circuit shown in FIG. 33.
Figure 35:
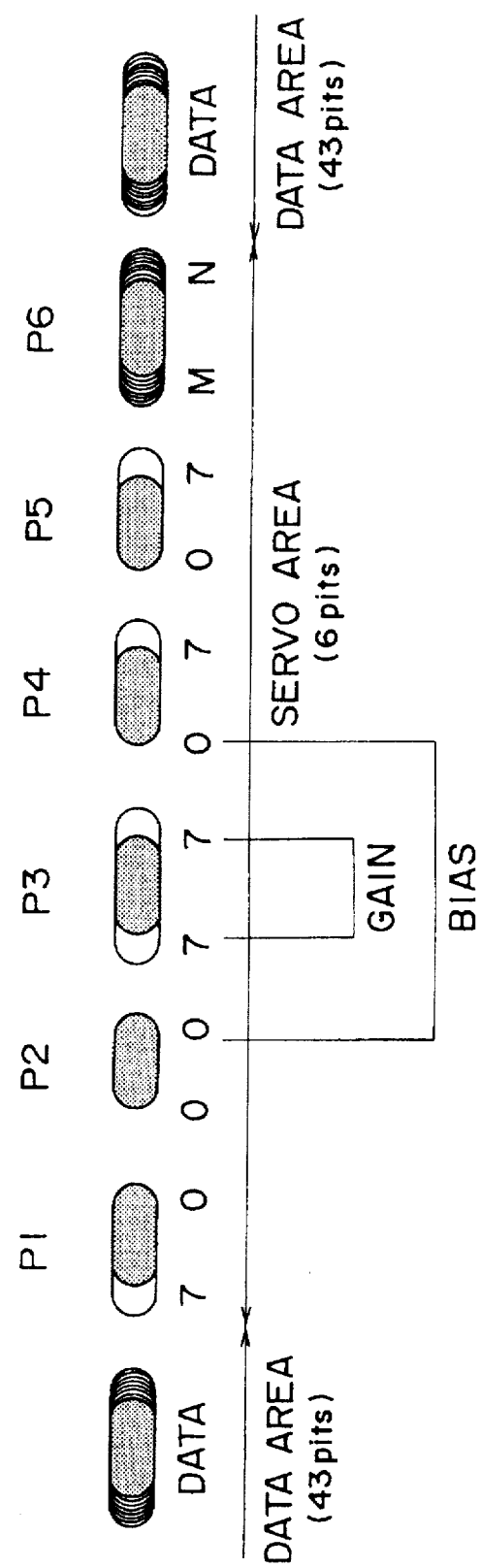
FIG. 35 is a diagrammatic view showing a pit for gain adjustment and pits for bias adjustment.

The bias removal circuit 36 and the AGC circuit 37 correspond to the bias removal circuit 97 and the AGC circuit 98 shown in FIG. 33, respectively, and are constructed in such a manner as shown in FIG. 34. The timing generator 43 generates an ACLK signal, a BCLK signal, an RACLK signal and an RBCLK signal or a KACLK signal and a KBCLK signal at the timing at which a bias reference signal is generated or at the timing at which a gain reference signal is generated from a clock signal supplied thereto from the PLL circuit 42, and outputs the thus generated signals to the bias removal circuit 36 and the AGC circuit 37, respectively. The bias removal circuit 36 and the AGC circuit 37 sample a reproduction signal making use of the ACLK signal, the BCLK signal, the RACLK signal and the RBCLK signal or the KACLK signal and the KBCLK signal and adjust the level of the reproduction signal to a predetermined value. Since such operation is described hereinabove with reference to FIG. 34, overlapping description thereof is omitted here.

After the processing by the bias removal circuit 36 and the AGC circuit 37 is performed, the sample value is further supplied to an equalizer 38, by which non-linear equalizing processing for suppressing inter-code interference and linear equalizing processing are performed, and the output of the equalizer 38 is supplied to a decoding circuit 39. The decoding circuit 39 performs two-dimensional decoding of the thus inputted sample value in such a manner as disclosed in U.S. patent application Ser. No. 08/133,124 mentioned hereinabove. Then, the thus decoded value is supplied to an error detection correction (ECC) circuit 40, by which error detection and correction processing is performed, and the output of the error detection correction circuit 40 is outputted to an information outputting circuit 41.

As shown in FIG. 5, totaling 10 bits are formed in each reference signal area described above. The capacity of each data area can be increased by decreasing the number of pits to be formed in each reference signal area as far as possible. Therefore, an attempt to reduce the number of pits in a reference signal area will be described below.

Figure 17:
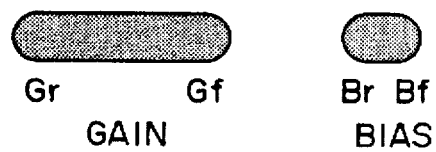
FIG. 17 s a diagrammatic view illustrating edge positions of a gain reference signal and a bias reference signal.
Figure 18A:
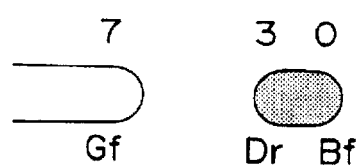
FIGS. 18A and 18B are diagrammatic views showing a pattern of pits when a phase reference signal of a leading edge is used also as a gain reference signal and a bias reference signal.
Figure 18B:
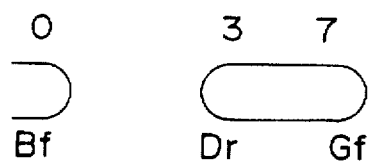

As seen from FIG. 17, the positions (Gr, Gf) of the edges of a gain reference signal are set to the maximum ones of the possible shift positions of an edge, that is, the positions (7, 7). In contrast, the edge positions (Br, Bf) for a bias reference signal are set to the minimum shift positions, that is, the positions (0, 0).

Therefore, the position far from and the position near to the reference position of a pattern for fine adjustment in phase described above can be set to the farthest position and the nearest position from and to the reference position, respectively.

FIGS. 18A, 18B and 19A, 19B show different examples in this instance. In particular, in the example shown in FIGS. 18A and 18B, the first pattern as a phase reference signal for a leading edge is defined by the positions Gf(7), Dr(3) and Bf(0), and the second pattern is defined by the positions Bf(0), Dr(3) and Gf(7).

Figure 19A:
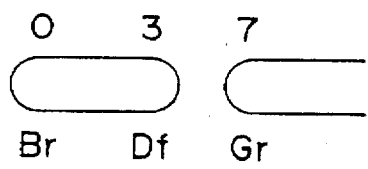
FIGS. 19A and 19B are diagrammatic views showing a pattern of pits when a phase reference signal of a trailing edge is used also as a gain reference signal and a bias reference signal.
Figure 19B:
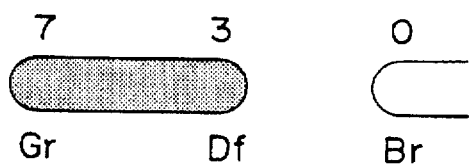

Similarly, as shown in FIGS. 19A and 19B, the first pattern for phase adjustment of a sampling clock for a trailing edge is defined by the positions Br(0), Df(3) and Gr(7), and the second pattern is defined by the positions Gr(7), Df(3) and Br(0).

Figure 20:
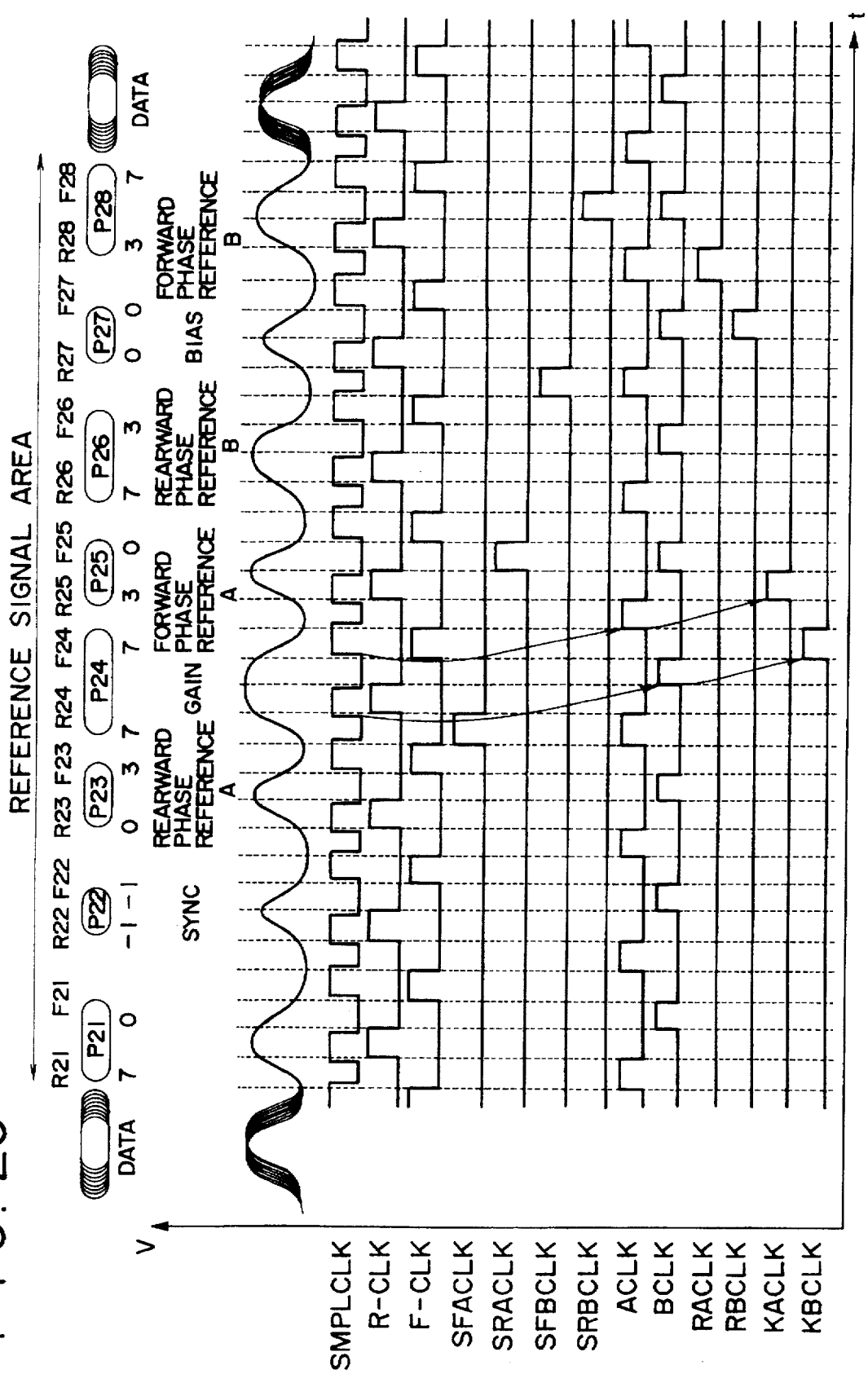
FIG. 20 is a time chart illustrating a construction of pits of a reference signal area formed from the pit patterns shown in FIGS. 18A, 18B and 19A, 19B.
Figure 21:
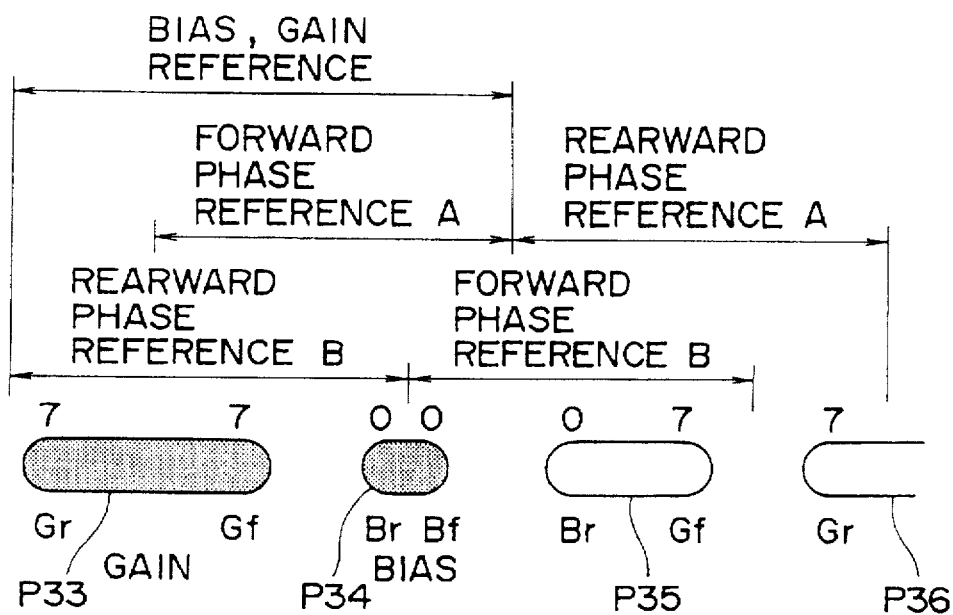
FIGS. 21 to 24 are diagrammatic views showing different patterns of pits when a phase reference signal is used also as a bias reference signal and a gain reference signal.

By the setting described above, a reference signal area can be constituted from 8 pits as seen from FIG. 20. Also in this construction, all of the education pit (7, 0), the synchronizing signal (-1, -1), the gain reference signal (7, 7), the bias reference signal (0, 0), the first pattern (7, 3, 0) and the second pattern (0, 3, 7) for adjustment against sampling phase displacement for a leading edge and the first pattern (0, 3, 7) and the second pattern (7, 3, 0) for adjustment against sampling phase adjustment for a trailing edge are formed.

The number of pits in a reference signal area can be further reduced by setting the discrimination position for the phase reference signal described above to a value equal to the value of the edge position Gr(7) or Gf(7) farthest from the reference position or the position Br(0) or Bf(0) nearest to the reference position.

FIGS. 21 to 24 illustrates different setting conditions in this instance. In particular, in the setting condition illustrated in FIG. 21, the edges (Gr, Gf) at the opposite ends of the pit P33 are set to the edges (7, 7) for gain adjustment, and the edges (Br, Bf) at the opposite ends of the pit P34 are set to the edges (0, 0) for bias reference. Then, the leading edge and the trailing edge of the pit P35 are set to Br(0) and Gf(7), respectively, and the leading edge of the pit P36 is set to Gr(7).

By the setting condition just described, the first pattern for phase adjustment of a leading edge can be constituted from the trailing edge of the pit P33 and the edges at the opposite ends of the pit P34 as (7, 0, 0), and the second pattern can be constituted from the trailing edge of the pit P34 and the edges at the opposite ends of the pit P35 as (0, 0, 7). Further, the first pattern for adjustment of a trailing edge can be constituted from the edges at the opposite ends of the pit P35 and the leading edge of the pit P36 as (0, 7, 7), and the second pattern can be constituted from the edges at the opposite ends of the pit P33 and the leading edge of the pit P34 as (7, 7, 0).

Figure 22:
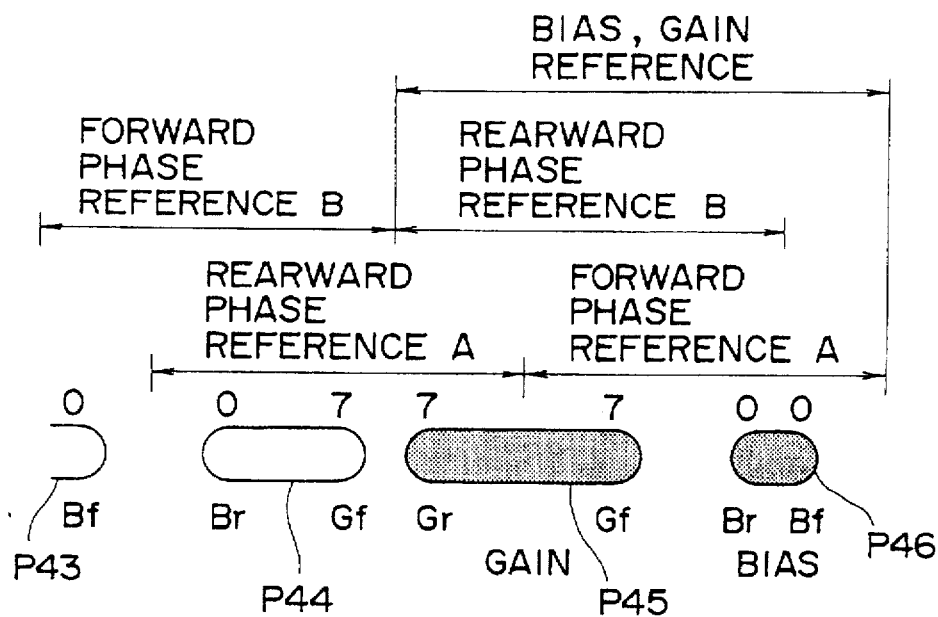

In the setting condition shown in FIG. 22, the trailing edge of the pit P43 is set to Bf(0), and the leading edge of the pit P44 is set to Br(0) while the trailing edge of the pit P44 is set to Gf(7). In the meantime, the leading edge of the pit P45 is set to Gr(7) while the trailing edge of the pit P45 is set to Gf(7), and the leading edge of the pit P46 is set to Br(0) while the trailing edge of the pit P46 is set to Bf(0).

The gain reference signal is constituted from the edges (7, 7) at the opposite ends of the pit P45, and the bias reference signal is constituted from the edges (0, 0) at the opposite ends of the pit P46.

Thus, the first pattern for a leading edge is constituted from the trailing edge of the pit P45 and the edges at the opposite ends of the pit P46 as (7, 0, 0), and the other or second pattern is constituted from the trailing edge of the pit P43 and the edges at the opposite edges of the pit P44 as (0, 0, 7). Further, the first pattern for phase adjustment of a trailing edge is constituted from the edges at the opposite ends of the pit P44 and the leading edge of the pit P45 as (0, 7, 7), and the second pattern is constituted from the edges at the opposite ends of the pit P45 and the leading edge of the pit P46 as (7, 7, 0).

Figure 23:
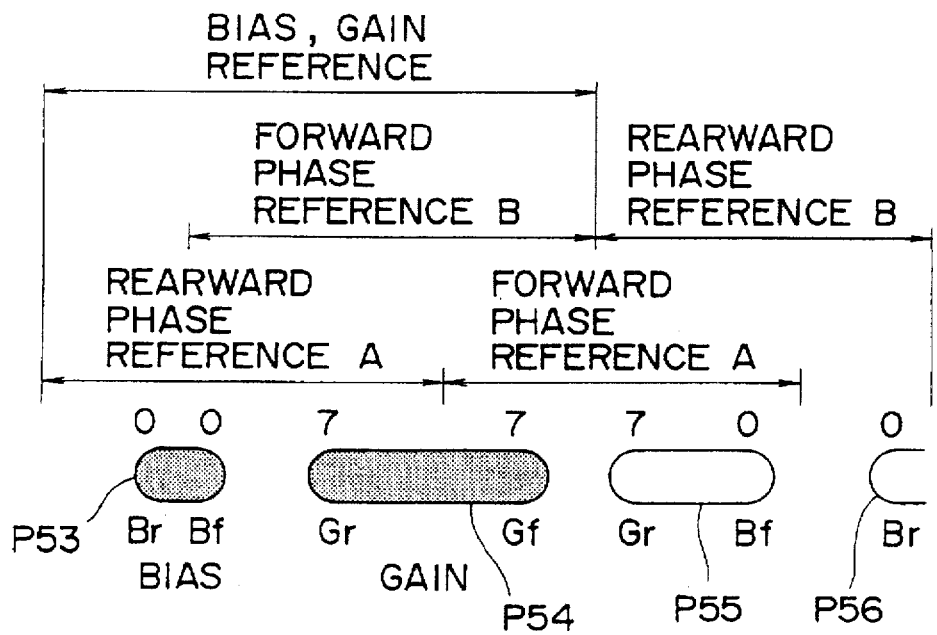

Further, in the setting condition illustrated in FIG. 23, the edges at the opposite ends of the pit P53 are set to Br(0) and Bf(0), and a bias reference signal is represented by them. Meanwhile, the edges at the opposite ends of the pit P54 are set to Gr(7) and Gf(7), and a gain reference signal is represented by them. Further, the leading edge of the pit P55 is set to Gr(7) and the trailing edge of the pit P55 is set to Bf(0). Further, the leading edge of the pit P56 is set to Br(0).

The first pattern for phase adjustment of a leading edge is constituted from the trailing edge of the pit P54 and the edges at the opposite ends of the pint P55 as (7, 7, 0), and the second pattern is constituted from the trailing edge of the pit P53 and the edges at the opposite ends of the pit P54 as (0, 7, 7). Further, the first pattern for phase adjustment of a trailing edge is constituted from the edges at the opposite ends of the pit P53 and the leading edge of the pit P54 as (0, 0, 7), and the second pattern is constituted from the edges at the opposite ends of the pit P55 and the leading edge of the pit P56 as (7, 0, 0).

Figure 24:
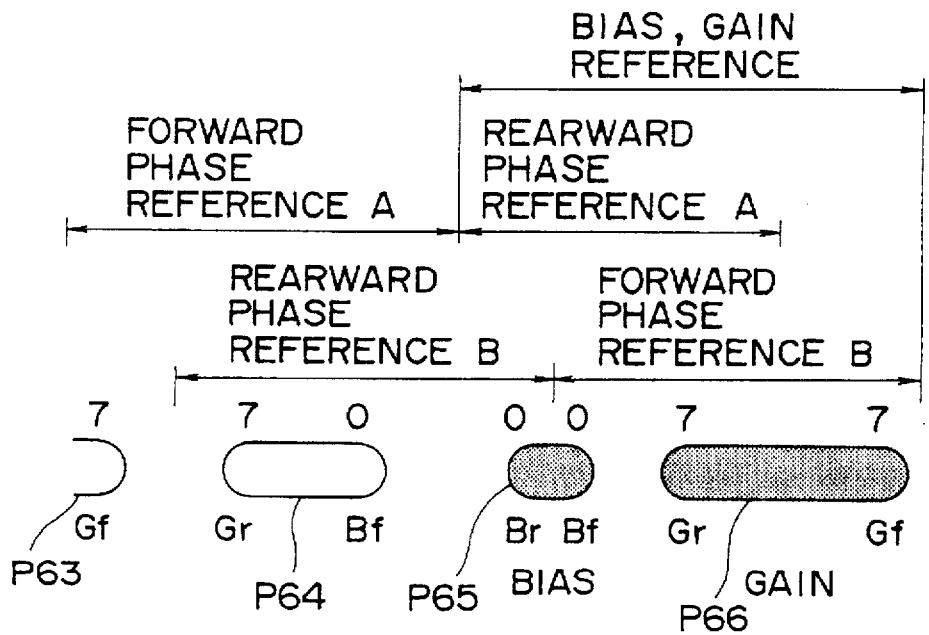
Figure 25:
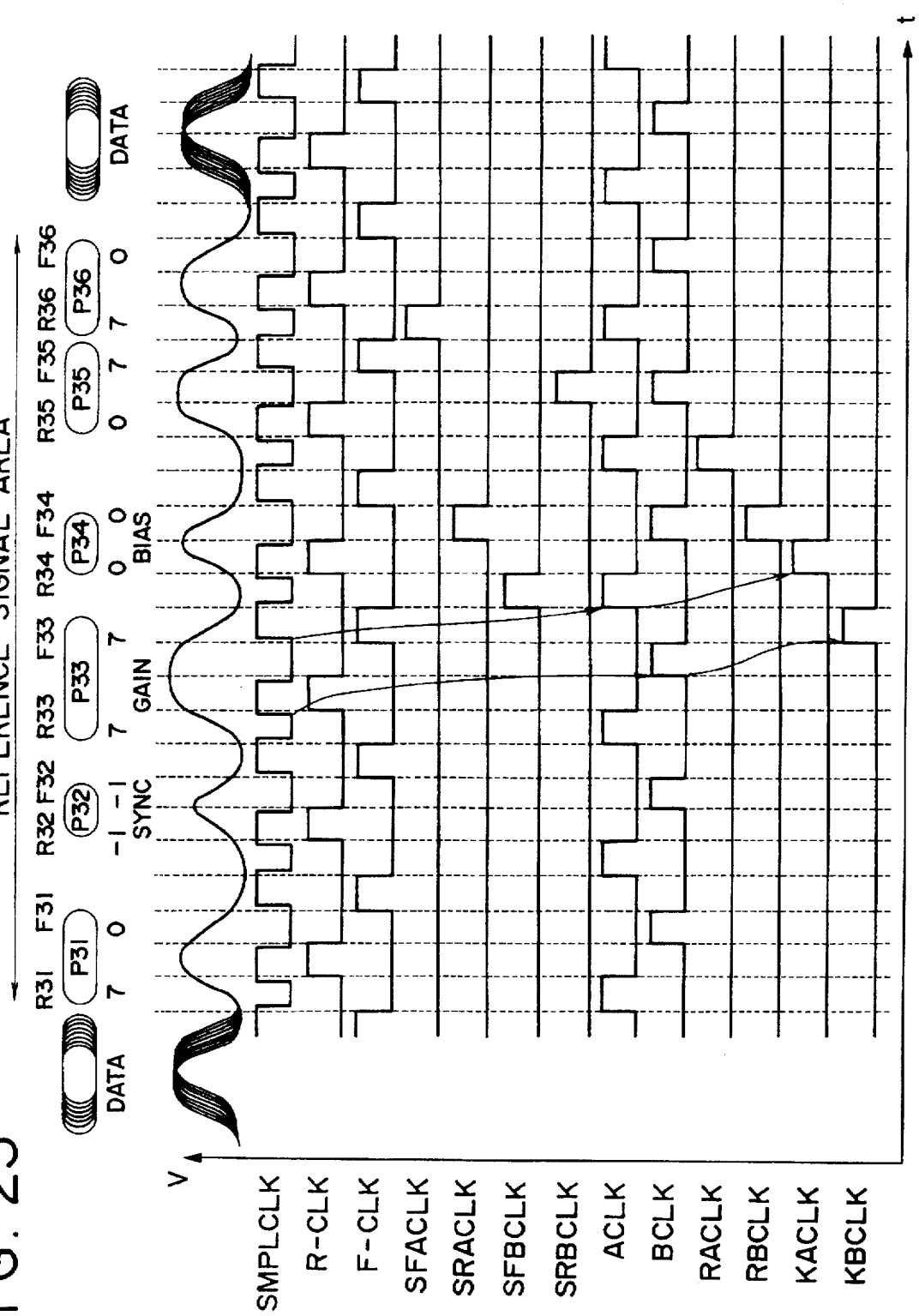
FIG. 25 is a time chart illustrating a construction of pits in a reference signal area formed based on the pattern shown in FIG. 21.
Figure 26:
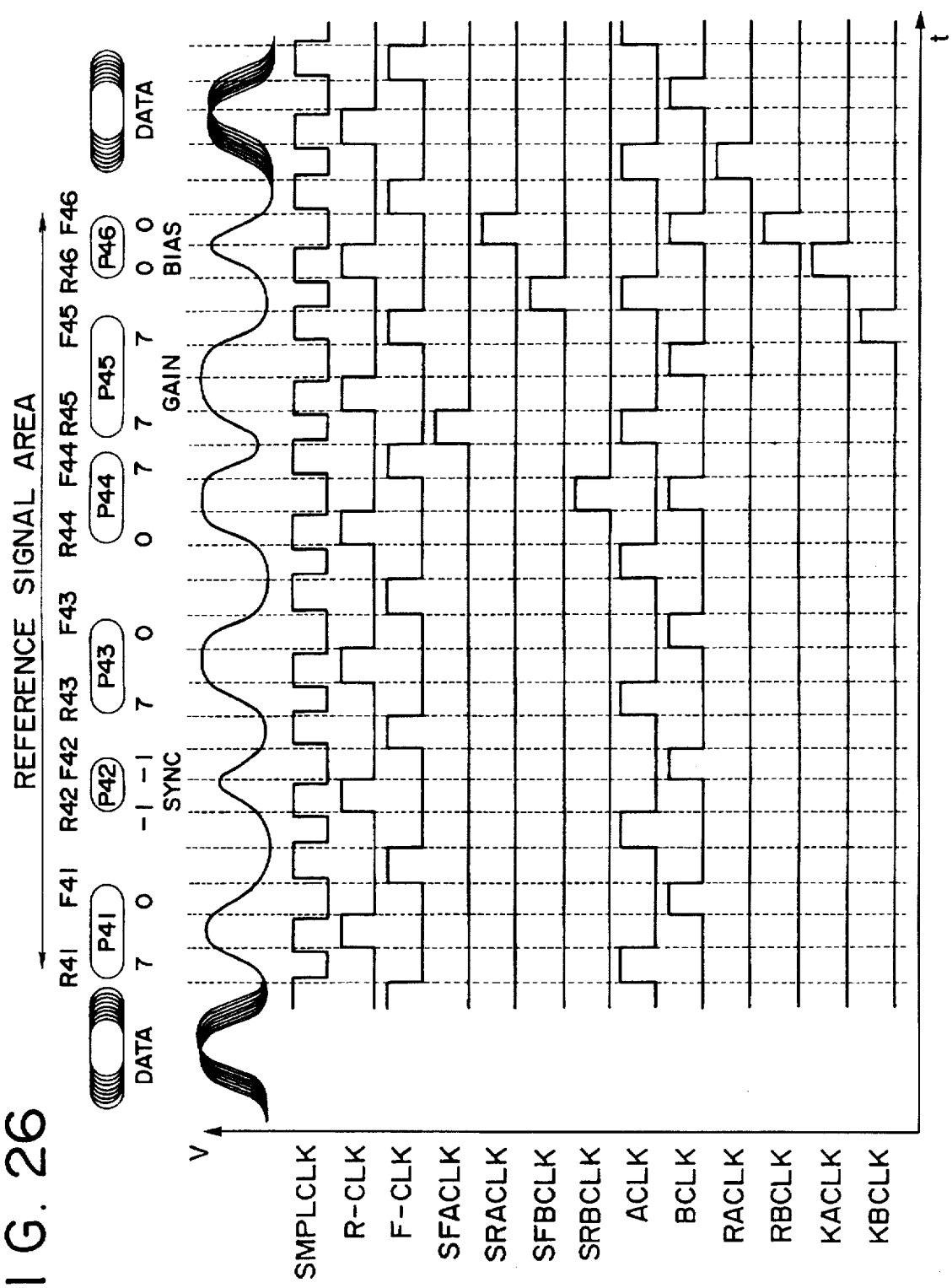
FIG. 26 is a time chart illustrating a construction of pits in a reference signal area formed based on the pattern in FIG. 22.
Figure 27:
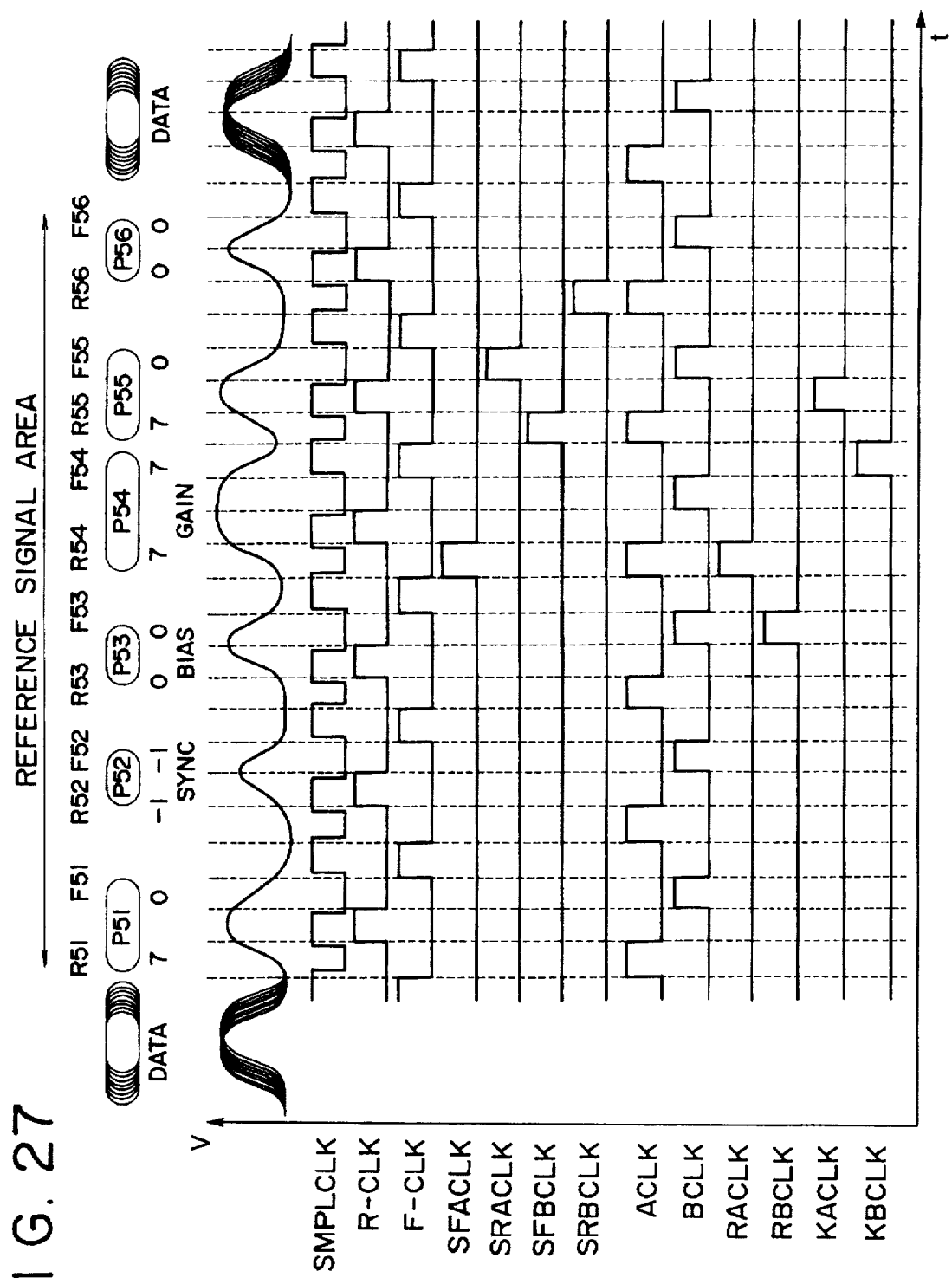
FIG. 27 is a time chart illustrating a construction of pits in a reference signal area formed based on the pattern shown in FIG. 23.
Figure 28:
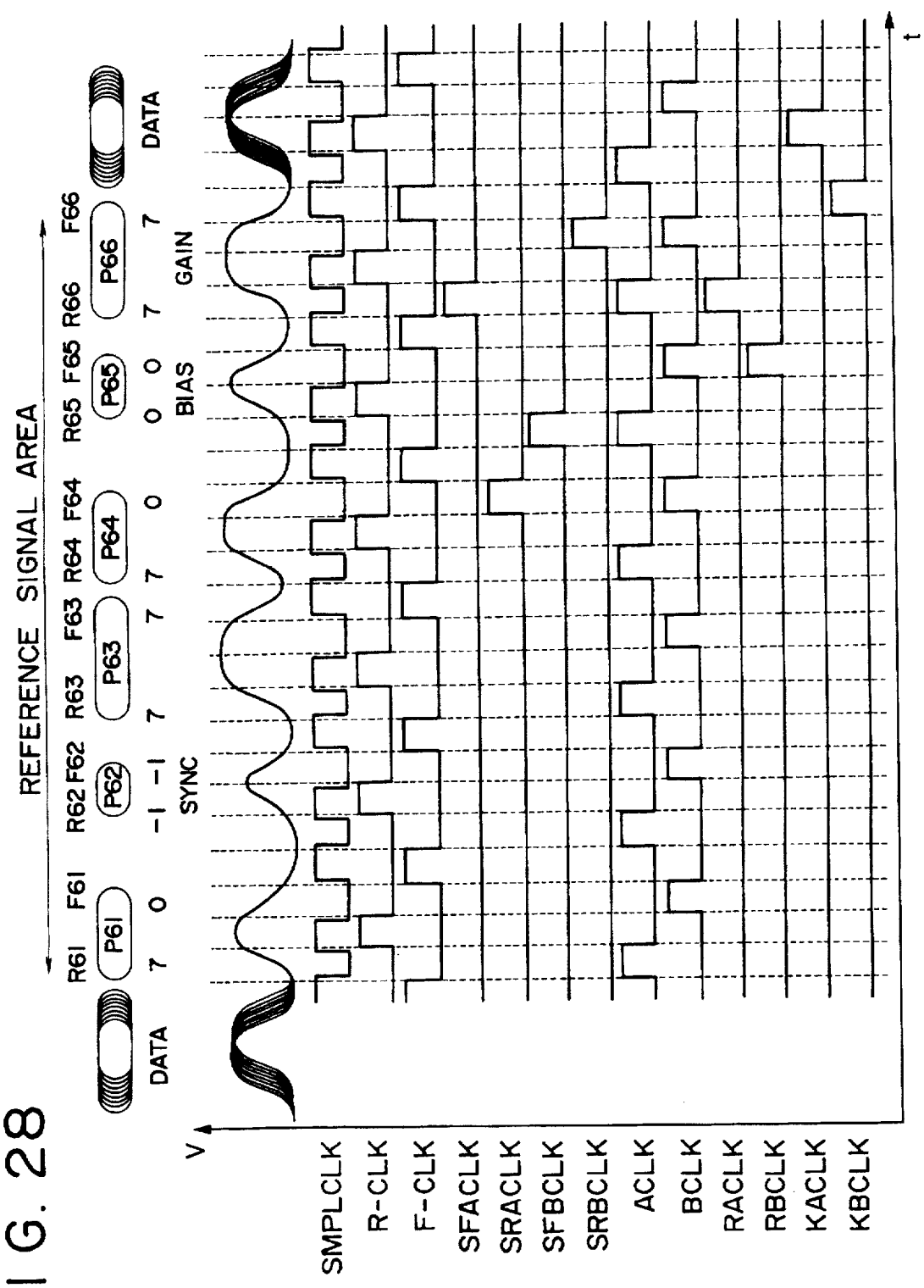
FIG. 28 is a time chart illustrating a construction of pits in a reference signal area formed based on the pattern shown in FIG. 24.

In the setting condition illustrated in FIG. 24, the trailing edge of the pit P63 is set to Gf(7), and the leading edge of the pit P64 is set to Gr(7) and the trailing edge of the pit P64 is set to Bf(0). Meanwhile, the edges at the opposite ends of the pit P65 are set to Bf(0) and Bf(0), and a bias reference signal is represented by them. Further, the leading edge of the pit P66 is set to Gr(7) and the trailing edge of the pit P66 is set to Gf(7), and a gain reference signal is represented by them.

The first pattern for phase adjustment of a leading edge is constituted from the trailing edge of the pit P63 and the edges at the opposite ends of the pit P64 as (7, 7, 0), and the second pattern is constituted from the trailing edge of the pit P65 and the edges at the opposite ends of the pit P66 as (0, 7, 7). Further, the first pattern for phase adjustment of a trailing edge are constituted from the edges at the opposite ends of the pit P65 and the leading edge of the pit P66 as (0, 0, 7), and the second pattern is constituted from the edges at the opposite ends of the pit P64 and the leading edge of the pit P65 as (7, 0, 0).

FIGS. 25 to 28 show reference signal areas formed in accordance with the setting patterns shown in FIGS. 21 to 24, respectively. As seen from FIGS. 25 to 28, a reference signal area can be constituted from six pits in any of the setting patterns. Consequently, the functions described above with reference to FIG. 5 or 20 can be realized with a further reduced number of pits.

Having now fully described the invention, it will be apparent to one of ordinary skill in the art that many changes and modifications can be made thereto without departing from the spirit and scope of the invention as set forth herein.

What is claimed is:

1. In a recording medium wherein positions of a leading edge and a trailing edge of each of pits formed at predetermined periods are shifted to individually selected ones of predetermined stepwise positions from a respective reference position in accordance with recording data to record the recording data on said recording medium, and the thus recorded data are read by sampling a reproduction signal reproduced from said recording medium in synchronism with a sampling clock signal, the improvement wherein first areas in which the recording data are recorded and second areas in which a reference signal for reading the recording data recorded in the first areas is recorded are formed periodically thereon, and the reference signal includes a phase reference signal which serves as a reference for fine adjustment of phase of the sampling clock signal, wherein the phase reference signal includes a signal of a first pattern constituted from positions of three successive first, second and third edges, and a signal of a second pattern constituted from positions of successive three other fourth, fifth and sixth edges and complementary to the first pattern.

2. A recording medium according to claim 1, wherein the position of the first edge constituting the first pattern is a first position near to the reference position; the position of the third edge is a third position far from the reference position; and the position of the second edge is an arbitrary second position, and the position of the fourth edge constituting the second pattern is the third position far from the reference position; the position of the sixth edge is the first position near to the reference position; and the position of the fifth edge is the second position.

3. A recording medium according to claim 2, wherein the first position is a position nearest to the reference position while the third position is another position farthest from the reference position.

4. A recording medium according to claim 3, wherein the second position is the same as one of the first and third positions.

5. A recording medium according to claim 4, wherein the reference signal includes at least one of a bias reference signal for adjustment of a level of the reproduction signal at the edge nearest to the reference position and a gain reference signal for adjustment of the level of the reproduction signal at the edge farthest from the reference position, and at least one of the first to sixth edges constitute one of the edges for the bias reference signal and the gain reference signal.

6. A recording medium according to claim 5, wherein the phase reference signal includes a first phase reference signal for fine adjustment of a phase of a first sampling clock signal for sampling the reproduction signal at the leading edges and a second phase reference signal for fine adjustment of a phase of a second sampling clock signal for sampling the reproduction signal at the trailing edges while the shift positions of the edges include eight different positions from a position 0 nearest to the reference position to a position 7 farthest from the reference position, and when the position 7 or another position near to the position 7 is represented as position A while the position 0 or another position near to the position 0 is represented as position B, the first and second phase reference signal, the bias reference signal and the gain reference signal are constituted from seven successive edges of the position A, the position A, the position B, the position B, the position B, the position A and the position A.

7. A recording medium according to claim 5, wherein the phase reference signal includes a first phase reference signal for fine adjustment of a phase of a first sampling clock signal for sampling the reproduction signal at the leading edges and a second phase reference signal for fine adjustment of a phase of a second sampling clock signal for sampling the reproduction signal at the trailing edges while the shift positions of the edges include eight different positions from a position 0 nearest to the reference position to a position 7 farthest from the reference position, and when the position 7 or another position near to the position 7 is represented as position A while the position 0 or another position near to the position 0 is represented as position B, the first and second phase reference positions, the bias reference signal and the gain reference signal are constituted from seven successive edges of the position B, the position B, the position A, the position A, the position A, the position B and the position B.

* * * * *